(12) United States Patent
Kobayashi et al.

(10) Patent No.: US 12,139,204 B2
(45) Date of Patent: Nov. 12, 2024

(54) WORK VEHICLE

(71) Applicant: KUBOTA CORPORATION, Osaka (JP)

(72) Inventors: Kumiko Kobayashi, Sakai (JP); Kunihiko Nishino, Sakai (JP); Shunya Mano, Sakai (JP); Kenzo Ushiro, Sakai (JP); Jinto No, Sakai (JP); Ryosuke Tanaka, Sakai (JP); Maho Yamanaka, Sakai (JP); Hiroyuki Tanaka, Sakai (JP); Manabu Togo, Sakai (JP)

(73) Assignee: KUBOTA CORPORATION, Osaka (JP)

(*) Notice: Subject to any disclaimer, the term of this patent is extended or adjusted under 35 U.S.C. 154(b) by 384 days.

(21) Appl. No.: 17/547,305

(22) Filed: Dec. 10, 2021

(65) Prior Publication Data

US 2022/0204098 A1 Jun. 30, 2022

(30) Foreign Application Priority Data

Dec. 24, 2020 (JP) ............... 2020-215829
Dec. 24, 2020 (JP) ............... 2020-215830
Dec. 24, 2020 (JP) ............... 2020-215832
Dec. 24, 2020 (JP) ............... 2020-215833

(51) Int. Cl.
*B60R 16/033* (2006.01)
*B60H 1/00* (2006.01)
(Continued)

(52) U.S. Cl.
CPC ..... *B62D 33/0625* (2013.01); *B60H 1/00378* (2013.01); *B60R 16/033* (2013.01);
(Continued)

(58) Field of Classification Search
CPC ........... B62D 33/0625; B62D 33/0621; B62D 49/0678; B62D 49/06; B62D 21/14; B62D 25/168; B60H 1/00378; B60H 1/245; B60H 1/241; B60H 1/00535; B60H 1/00564; B60H 1/00207; B60H 1/3232
See application file for complete search history.

(56) References Cited

U.S. PATENT DOCUMENTS 2,268,667 A * 1/1942 Mendez ............. B60H 1/32281
62/133
4,432,213 A * 2/1984 Katahira ............ B60H 1/00207
62/239
(Continued)

FOREIGN PATENT DOCUMENTS

CN 204196653 U * 3/2015
CN 108422830 A * 8/2018 ......... B60H 1/00028
(Continued)

OTHER PUBLICATIONS

Official Communication issued in corresponding Japanese Patent Application No. 2020-215830, mailed on Aug. 1, 2023.
(Continued)

*Primary Examiner* — Steve Clemmons
(74) *Attorney, Agent, or Firm* — Keating & Bennett, LLP

(57) ABSTRACT

A work vehicle is provided with a body, a driver section and an air conditioner, and the air conditioner is supported by the body and located on a side of the body.

29 Claims, 20 Drawing Sheets

(51) Int. Cl.
*B62D 21/14* (2006.01)
*B62D 25/16* (2006.01)
*B62D 33/06* (2006.01)
*B62D 49/06* (2006.01)

(52) U.S. Cl.
CPC ............ *B62D 21/14* (2013.01); *B62D 49/06* (2013.01); *B62D 25/168* (2013.01)

(56) References Cited

U.S. PATENT DOCUMENTS

| | | | | |
|---|---|---|---|---|
| 4,946,193 | A * | 8/1990 | Oka | B62K 7/04 |
| | | | | 180/908 |
| 5,421,645 | A * | 6/1995 | Young | B60R 11/06 |
| | | | | 296/37.6 |
| 8,167,072 | B2 * | 5/2012 | Leonard | F41A 23/34 |
| | | | | 180/90 |
| 9,045,028 | B2 * | 6/2015 | Ichikawa | B60L 1/08 |
| 9,272,636 | B2 * | 3/2016 | Ichikawa | B60K 17/10 |
| 9,316,338 | B2 * | 4/2016 | Doi | F16L 55/09 |
| 9,323,278 | B2 * | 4/2016 | Masumoto | G05G 25/04 |
| 10,589,971 | B2 * | 3/2020 | Arnold | A01D 46/20 |
| 2021/0252948 | A1 * | 8/2021 | Van Wijk | B60H 1/3232 |

FOREIGN PATENT DOCUMENTS

| | | | | |
|---|---|---|---|---|
| JP | 49-111950 | U | | 9/1974 |
| JP | 03-182808 | A | | 8/1991 |
| JP | H08108741 | A * | 4/1996 | |
| JP | 09-315140 | A | | 12/1997 |
| JP | H10129237 | A * | 5/1998 | |
| JP | H10338024 | A * | 12/1998 | |
| JP | 2000-016788 | A | | 1/2000 |
| JP | 2000-139148 | A | | 5/2000 |
| JP | 3283759 | B2 * | 5/2002 | |
| JP | 2006008076 | A * | 1/2006 | ......... B60H 1/00378 |
| JP | 2006312456 | A * | 11/2006 | |
| JP | 2008-263920 | A | | 11/2008 |
| JP | 2015-067063 | A | | 4/2015 |
| JP | 2015-077882 | A | | 4/2015 |
| KR | 20120111877 | A * | 10/2021 | |
| WO | WO-2006070558 | A1 * | 7/2006 | ......... B60H 1/00535 |

OTHER PUBLICATIONS

Official Communication issued in corresponding Japanese Patent Application No. 2020-215829, mailed on Aug. 1, 2023.

* cited by examiner

WORK VEHICLE

CROSS REFERENCE TO RELATED APPLICATIONS

This application claims the benefit of priority to Japanese Patent Application No. 2020-215829 filed on Dec. 24, 2020, Japanese Patent Application No. 2020-215830 filed on Dec. 24, 2020, Japanese Patent Application No. 2020-215832 filed on Dec. 24, 2020 and Japanese Patent Application No. 2020-215833 filed on Dec. 24, 2020. The entire contents of each of these applications are hereby incorporated herein by reference.

BACKGROUND OF THE INVENTION

1. Field of the Invention

The present invention relates to a work vehicle including an air conditioner unit for a driver section.

The present invention also relates to a work vehicle including left and right travel apparatuses.

The present invention also relates to a work vehicle in which treads of the left and right travel apparatuses can be changed.

The present invention also relates to a work vehicle including an electrically-powered apparatus that is operable as a result of being supplied with electricity.

2. Description of the Related Art

For example, a work vehicle described in JP 2000-16788A is already known as a work vehicle such as that described above. This work vehicle (a "battery-powered forklift" in JP 2000-16788A) includes a head guard that covers the driver seat. Also, an air conditioner unit is mounted on the ceiling portion of the head guard.

As the work vehicle described above, for example, a work vehicle described in JP H3-182808A is already known. This work vehicle ("tractor" in JP H3-182808A) includes left and right travel apparatuses ("rear wheels" in JP H3-182808A). The left and right travel apparatuses are attached to the vehicle body via a rear axle case.

Also, in the work vehicle described in JP H3-182808A, the tread of the left and right travel apparatuses changes due to the rear axle case expanding and contracting in the body left-right direction.

As the work vehicle described above, for example, the work vehicle described in JP 2000-16788A is already known. This work vehicle ("battery-powered forklift" in JP 2000-16788A) is provided with a head guard that covers the driver seat. Also, an electrically-powered apparatus ("air conditioner unit" in JP 2000-16788A) is mounted on the ceiling of the head guard.

JP 2000-16788A and JP H3-182808A are examples of prior art.

SUMMARY OF THE INVENTION

In the work vehicle described in JP 2000-16788A, the air conditioner unit is arranged at a relatively high position. As a result, the position of the center of gravity of the work vehicle tends to be relatively high. As a result, the orientation of the work vehicle tends to be unstable.

Preferred embodiments of the present invention improve the stability of the orientation of the work vehicle.

The work vehicle described in JP 2000-16788A is not provided with a space in which an electrically-powered apparatus, a work tool, or the like to be additionally mounted can be placed. For this reason, this work vehicle has poor expandability of functions, and there is room for improvement in convenience.

Preferred embodiments of the present invention improve the expandability of functions and convenience of the work vehicle.

In the work vehicle described in JP H3-182808A, it is conceivable to provide an air conditioner unit for the driver section in which the driver is riding. However, in such a configuration, a situation is envisioned in which waste water discharged from the air conditioner unit undesirably falls on an object. For example, a situation is envisioned in which, when this work vehicle travels along a longitudinal direction of a ridge in a ridge field, the waste water discharged from the air conditioner unit undesirably falls on the ridge and a crop planted in the ridge.

Preferred embodiments of the present invention provide work vehicles in which it is easy to avoid a situation in which waste water discharged from the air conditioner unit undesirably falls on an object.

JP 2000-16788A does not describe a member for supplying electricity to an electrically-powered apparatus. Here, in the work vehicle described in JP 2000-16788A, it is conceivable to provide a power supply apparatus for supplying electricity to the electrically-powered apparatus and to arrange this power supply apparatus on the ceiling of the head guard.

However, when the power supply apparatus is arranged on the ceiling of the head guard, the power supply apparatus is arranged at a relatively high position. As a result, the position of the center of gravity of the work vehicle tends to be relatively high. As a result, the orientation of the work vehicle tends to be unstable.

Preferred embodiments of the present invention improve the stability of the orientation of the work vehicle.

A feature of one preferred embodiment of the present invention includes a body, a driver section, and an air conditioner, in which the air conditioner is supported on the body and located on a side of the body.

In one preferred embodiment of the present invention, the air conditioner is located on the side of the body. For this reason, the arrangement position of the air conditioner is low compared to the case where the air conditioner is located on the ceiling of the driver section. As a result, the position of the center of gravity of the work vehicle is relatively low. As a result, the orientation of the work vehicle is stable.

That is, in one preferred embodiment of the present invention, the stability of the orientation of the work vehicle can be improved.

Furthermore, in one preferred embodiment of the present invention, it is preferable that the air conditioner is provided on one of lateral sides of the body.

Generally, in a work vehicle, a work apparatus is often provided at the body front portion or the body rear portion. For example, if the work vehicle is a combine, a reaper, which is a work apparatus, is provided at the body front portion. Also, if the work vehicle is a rice transplanter, a seedling planter apparatus, which is a work apparatus, is provided at the body rear portion.

For this reason, in a configuration in which the air conditioner is located on the body front side or the body rear side, a situation is envisioned in which the air conditioner interferes with the work apparatus.

Here, according to the above-described configuration, the air conditioner is provided on the lateral side on one side in the body left-right direction. Accordingly, even if the work apparatus is provided at the body front portion or the body rear portion, it is possible to realize a work vehicle in which the air conditioner is not likely to interfere with the work apparatus.

Also, in one preferred embodiment of the present invention, it is preferable that the work vehicle further includes left and right travel apparatuses, in which the air conditioner is provided toward a body center in a body left-right direction relative to a lateral outer end portion of one of the left and right travel apparatuses on one side in the body left-right direction.

According to this configuration, the air conditioner is less likely to interfere with a wall of a building, an obstacle, or the like, compared to the configuration in which the air conditioner protrudes laterally relative to the lateral outer end portion of the one of the left and right travel apparatuses on one side in the body left-right direction. For this reason, it is easy to avoid a situation in which traveling is hindered due to the air conditioner interfering with the wall of the building, the obstacle, or the like.

Furthermore, in one preferred embodiment of the present invention, it is preferable that the work vehicle further includes left and right travel apparatuses, in which the air conditioner is provided above and overlapping one of the left and right travel apparatuses on one side in the body left-right direction in a plan view.

According to this configuration, the air conditioner is more likely to fit compactly in a plan view, compared to a configuration in which the air conditioner does not overlap with the travel apparatus in a plan view. This makes it easy to realize a compact work vehicle including an air conditioner.

Furthermore, in one preferred embodiment of the present invention, it is preferable that the left and right travel apparatuses include front travel apparatuses and rear travel apparatuses, and the air conditioner is provided above and overlapping one of the rear travel apparatuses on one side in the body left-right direction in a plan view.

According to this configuration, the arrangement position of the air conditioner is on the rear side compared to the configuration in which the air conditioner is provided above the front travel apparatus. For this reason, it is less likely that a situation will occur in which the field of view in front of the driver is narrowed by the air conditioner, the duct connected to the air conditioner, or the like, compared with the configuration in which the air conditioner is provided above the front travel apparatus. As a result, it is easy to realize a work vehicle in which the air conditioner is included but the field of view in front of the driver is not narrowed.

Furthermore, in one preferred embodiment of the present invention, it is preferable that the work vehicle further includes left and right travel apparatuses, and left and right fenders that are located above the left and right travel apparatuses in a side view, in which the air conditioner is provided below and overlapping one of the left and right fenders on one side in the body left-right direction in a plan view.

According to this configuration, the arrangement position of the air conditioner is low compared to the configuration in which the air conditioner is located above the fender. As a result, the position of the center of gravity of the work vehicle is relatively low. As a result, the orientation of the work vehicle is stable.

That is, with this configuration, the stability of the orientation of the work vehicle can be even further improved.

Furthermore, in one preferred embodiment of the present invention, it is preferable that the travel apparatuses protrude outward in the body left-right direction relative to the respective fenders, and the air conditioner extends between a location above the travel apparatus on one side in the body left-right direction and a location below the fender on the one side in the body left-right direction.

According to this configuration, the air conditioner is between the fender and the travel apparatus in the body vertical direction. This makes it possible to effectively utilize the space between the fender and the travel apparatus.

Furthermore, in one preferred embodiment of the present invention, it is preferable that the work vehicle further includes a duct to guide air from the air conditioner to the driver section, and a connection portion connecting the duct and the air conditioner, in which the air conditioner protrudes outward in the body left-right direction relative to one of the left and right fenders on one side in the body left-right direction, and the connection portion is provided at an upper surface portion of a portion of the air conditioner that protrudes from the one of the left and right fenders on the one side in the body left-right direction.

If the upper portion of the connection portion is covered by the fender, for example, a measure such as providing a hole in the fender and arranging the duct in a state where the duct passes through the hole is needed. As a result, the structure of the duct, the support for the duct, the fender, and the like tends to be complicated.

Here, according to the above-described configuration, the upper portion of the connection portion is not covered by the fender. For this reason, for example, no measure such as providing a hole in the fender and arranging the duct in a state where the duct passes through the hole is needed. As a result, the structure of the duct, the support for the duct, the fender, and the like tends to be simplified. As a result, the manufacturing cost is likely to decrease.

Furthermore, in one preferred embodiment of the present invention, it is preferable that the work vehicle further includes a power source, and a converter to convert a voltage of electricity to be supplied from the power source into a needed voltage of the air conditioner, in which the converter is provided on one side in the body left-right direction relative to a central position of the body, in the body left-right direction.

According to this configuration, both the air conditioner and the converter are provided on one side (the same side) in the body left-right direction relative to the center position of the body. As a result, the layout of the wiring connecting the air conditioner and the converter is simple compared to the configuration in which the converter is provided on the other side (different side) in the body left-right direction relative to the center position of the body. As a result, the manufacturing cost is likely to decrease.

Furthermore, in one preferred embodiment of the present invention, it is preferable that the driver section includes a driver seat, and the air conditioner is provided at a position lower than an upper end portion of the driver seat.

According to this configuration, the arrangement position of the air conditioner is lower than that in the configuration in which the air conditioner is provided at a position higher than the upper end portion of the driver seat. As a result, the position of the center of gravity of the work vehicle is relatively lower. As a result, the orientation of the work vehicle is stable.

That is, with this configuration, the stability of the orientation of the work vehicle can be even further improved.

Furthermore, in one preferred embodiment of the present invention, it is preferable that the air conditioner includes a heat exchanger and a case to accommodate the heat exchanger, and the case includes an intake port for the heat exchanger, at a position of the case facing toward a center of the body in a plan view.

According to this configuration, mud, dust, and the like are less likely to enter the intake port compared to a configuration in which the intake port is provided in the portion of the case facing the outside of the body in a plan view. As a result, the frequency with which maintenance of the air conditioner is required tends to decrease.

Furthermore, in one preferred embodiment of the present invention, it is preferable that the work vehicle further includes a wall that extends over a vertical width of the intake port and extends over a lateral width of the intake port, at a position opposing the intake port in a state of being spaced apart from the intake port.

According to this configuration, the wall can prevent mud, dust, and the like spattering or flying toward the intake port from entering the intake port. For this reason, it is difficult for mud, dust, and the like to enter the intake port. As a result, the frequency with which maintenance of the air conditioner is required tends to decrease.

A feature of one preferred embodiment of the present invention includes a main body supported by a body frame, left and right travel apparatuses to support the main body, and at least one deck that protrudes to a body outer side relative to the main body, in which the deck is supported by the body frame.

According to one preferred embodiment of the present invention, since the deck protrudes to the body outer side, an electrically-powered apparatus, work tools, and the like to be additionally mounted can be easily placed on the deck. Moreover, since the deck is supported by the body frame, the apparatuses, tools, and the like mounted on the deck are easily stably supported by the deck.

As a result, it is possible to ensure a space on the deck in which electrically-powered apparatuses, work tools, and the like to be additionally mounted can be placed.

That is, according to one preferred embodiment of the present invention, it is possible to improve the expandability of functions and convenience of the work vehicle.

Furthermore, in one preferred embodiment of the present invention, it is preferable that the deck is provided on one of lateral sides of the body.

Generally, in a work vehicle, a work apparatus is often provided at the body front portion or the body rear portion. For example, if the work vehicle is a combine, a reaper, which is a work apparatus, is provided at the body front portion. Also, if the work vehicle is a rice transplanter, a seedling planter apparatus, which is a work apparatus, is provided at the body rear portion.

For this reason, if the deck protrudes to the body front side or the body rear side, the deck interferes with the work apparatus.

Here, according to the above-described configuration, the deck is provided on the lateral side on one side in the body left-right direction. Accordingly, even if the work apparatus is provided at the body front portion or the body rear portion, it is possible to realize a work vehicle in which the deck is not likely to interfere with the work apparatus.

Furthermore, in one preferred embodiment of the present invention, it is preferable that the deck is provided toward a body center in a body left-right direction relative to a lateral outer end portion of the travel apparatus on one side in the body left-right direction.

According to this configuration, the deck is less likely to interfere with a wall of a building, an obstacle, or the like compared to the configuration in which the deck protrudes laterally relative to the lateral outer end portion of the travel apparatus on one side in the body left-right direction. For this reason, it is easy to avoid a situation in which traveling is hindered by the deck interfering with the wall of the building, the obstacle, or the like.

Furthermore, in one preferred embodiment of the present invention, it is preferable that the deck is provided at a position higher than the travel apparatuses.

According to this configuration, it is possible to realize a work vehicle in which the deck is not likely to interfere with obstacles or the like present at a relatively low position. For example, if the work vehicle is used in a ridge field, it is possible to realize a work vehicle in which the deck is not likely to interfere with the ridges.

Furthermore, in one preferred embodiment of the present invention, it is preferable that the travel apparatuses include front travel apparatuses and rear travel apparatuses, and the at least one deck includes a plurality of decks, and the plurality of decks include a front deck provided above and overlapping the front travel apparatus on one side in the body left-right direction in a plan view, and a rear deck provided above and overlapping the rear travel apparatus on the one side in the body left-right direction in a plan view.

According to this configuration, there are more locations where electrically-powered apparatuses, work tools, and the like to be additionally mounted can be placed, than in the case of the configuration in which only one deck is provided. Also, since the front deck and the rear deck are arranged in the front-rear direction, a plurality of apparatuses, tools, and the like that are related to each other can be provided at locations divided between the front deck and the rear deck. For this reason, the expandability of functions and convenience of the work vehicle can be even further improved.

Furthermore, in one preferred embodiment of the present invention, it is preferable that the work vehicle further includes left and right fenders that are each located above the corresponding travel apparatuses in a side view, in which the deck is provided below the fender on one side in the body left-right direction among the left and right fenders, in a state of overlapping with the fender on the one side in the body left-right direction in a plan view.

According to this configuration, the deck is located between the fender and the travel apparatus in the body vertical direction. This makes it possible to effectively utilize the space between the fender and the travel apparatus.

Furthermore, in one preferred embodiment of the present invention, it is preferable that the work vehicle further includes a support frame to support the deck, wherein the deck is provided at a position between the travel apparatus on one side in the body left-right direction and the fender on the one side in the body left-right direction in a body vertical direction, the support frame is on an inner side in the body left-right direction of the travel apparatus on the one side in the body left-right direction, and below the fender on the one side in the body left-right direction, the support frame is supported by the body frame, and the deck is detachable outward in the body left-right direction by decoupling the deck and the support frame from each other.

According to this configuration, the deck can be easily removed from the body by merely decoupling the deck and the support frame. This makes it easier to perform maintenance work on the deck, the electrically-powered apparatuses mounted on the deck, and the like.

Furthermore, in one preferred embodiment of the present invention, it is preferable that the support frame is fastened and fixed to the body frame by a fastener, and is attachable to and detachable from the body frame.

According to this configuration, the support frame and the deck can be removed in one piece from the body by merely unfastening the fastener. Also, the support frame and the deck can be attached in one piece to the body by merely fastening the fastener. As a result, it is possible to realize a work vehicle that can easily switch between a state in which the deck is attached to the body and a state in which the deck is removed from the body.

A feature of one preferred embodiment of the present invention is a work vehicle including a driver section, a body frame to support the driver section, left and right travel apparatuses to support the body frame, and a tread changing apparatus to change a tread between the left and right travel apparatuses by moving the travel apparatuses in a body left-right direction with respect to the body frame, the work vehicle including an air conditioner, a drain pipe connected to the air conditioner and including a drain port and a drain port-side portion at which a drain portion is provided, a first support provided on a body frame-side with respect to the tread changing apparatus, and a second support provided toward the travel apparatus with respect to the tread changing apparatus, in which the air conditioner is supported by the first support, and the drain port-side portion is supported by the second support, and moves following movement of the travel apparatuses when the tread is changed.

According to one preferred embodiment of the present invention, the drain port-side portion of the drain pipe moves following the movement of the travel apparatus when the tread is changed. This makes it easy to control the position of the drain port in the body left-right direction by changing the tread.

That is, if the tread is changed appropriately, it is possible to avoid a situation in which the waste water discharged from the air conditioner undesirably falls on an object. For example, when the work vehicle travels in a ridge field along the longitudinal direction of a ridge, if the tread is changed appropriately, it is possible to avoid a situation in which the waste water discharged from the air conditioner is applied to the ridge and a crop planted in the ridge.

Accordingly, with one preferred embodiment of the present invention, it is possible to realize a work vehicle in which it is easy to avoid a situation in which the waste water discharged from the air conditioner undesirably falls on an object.

Furthermore, in one preferred embodiment of the present invention, it is preferable that the drain port-side portion is supported by the second support such that waste water from the drain port is drained within a width of the tread.

According to this configuration, the region of the ground surface where waste water can be applied falls within the width of the tread. As a result, the region of the ground surface where the waste water can be applied is limited compared to the configuration in which the waste water from the drain port is drained to outside the width of the tread. As a result, it is even easier to avoid a situation in which the waste water discharged from the air conditioner undesirably falls on an object.

Furthermore, in one preferred embodiment of the present invention, it is preferable that the left and right travel apparatuses are left and right wheels, and the drain port-side portion is extended at least to a height corresponding to a rotation axis of the wheel in a vertical direction.

According to this configuration, the position of the drain port is relatively low. As a result, the region of the ground surface where the waste water can be applied is limited compared to the configuration in which the position of the drain port is relatively high. As a result, it is even easier to avoid a situation in which the waste water discharged from the air conditioner undesirably falls on an object.

Furthermore, in one preferred embodiment of the present invention, it is preferable that the left and right travel apparatuses are left and right wheels, the work vehicle includes a transmission supported by the body frame, and left and right axle cases connecting the transmission and the left and right wheels, the axle case includes a horizontal case portion extended outward in the body left-right direction from the transmission and a vertical case portion that is extended downward from a free end of the horizontal case portion and includes a lower end portion on which the wheel is supported, the tread changing apparatus is provided in the horizontal case portion to change an extension length of the horizontal case, and the drain port-side portion is supported by the vertical case portion.

Generally, the axle case is relatively strong.

Here, according to the above-described configuration, the drain port-side portion is supported by the vertical case portion in the axle case. As a result, the drain port-side portion is stably supported.

Furthermore, in one preferred embodiment of the present invention, it is preferable that the drain port-side portion is extended vertically along the vertical case portion.

According to this configuration, the drain port-side portion is protected by the vertical case portion. As a result, it is possible to realize a configuration in which the drain port-side portion is protected without providing a dedicated member for protecting the drain port-side portion. As a result, the manufacturing cost is likely to decrease.

Moreover, according to this configuration, the position of the drain port is likely to be close to the position of the wheel in the body left-right direction. For this reason, the position on the ground surface where the waste water is applied is likely to be close to a position through which the wheel passes. Accordingly, when the work vehicle travels in a state where the wheels avoid an object for which application of waste water is not desirable, it is easy to avoid a situation in which the waste water discharged from the air conditioner undesirably falls on an object.

For example, it is easy to avoid a situation in which, in a ridge field, when a work vehicle travels in a state where the wheels avoid the ridges (a state where the wheels pass through the ridges), the waste water discharged from the air conditioner is applied to the ridges and crops planted in the ridges.

Furthermore, in one preferred embodiment of the present invention, it is preferable that the travel apparatus includes an upper support thereabove that does not follow the movement of the travel apparatuses when the tread is changed, and the upper support supports an intermediate portion of the drain pipe, and the drain pipe hangs downward from the upper support and the drain port-side portion is supported by the second support.

When the drain port-side portion is movable by following the movement of the travel apparatus during the change of the tread, the movement direction of the drain port-side portion during the change of the tread is the body left-right direction. Also, in this configuration, it is necessary to allow the drain pipe to have slack so as to allow movement of the drain port-side portion.

In this configuration, the intermediate portion of the drain pipe is supported by the upper support, the drain pipe extends from the upper support in the body left-right direction, and when the drain port-side portion is supported by the second support, the movement direction of the drain port-side portion during the change of the tread and the direction in which the drain pipe extends are the same. As a result, it is necessary to relatively increase the slack in the drain pipe when the tread of the left and right travel apparatuses is narrowest. As a result, the slack portion of the drain pipe tends to interfere with other members.

Here, according to the above-described configuration, the drain pipe hangs downward from the upper support. For this reason, the movement direction of the drain port-side portion during the change of the tread and the direction in which the drain pipe extends are different from each other. Accordingly, the slack in the drain pipe is allowed to be relatively small. As a result, it is easy to avoid a situation in which the slack portion of the drain pipe interferes with other members.

Furthermore, in one preferred embodiment of the present invention, it is preferable that the air conditioner is mounted on and supported by the upper support.

According to this configuration, both the intermediate portion of the drain pipe and the air conditioner are supported by the upper support. As a result, the manufacturing cost is likely to decrease compared to the case where the member supporting the intermediate portion of the drain pipe and the member supporting the air conditioner are provided separately.

A feature of one preferred embodiment of the present invention includes a body, a power supply apparatus, and an electrically-powered apparatus to operate as a result of being supplied with electricity from the power supply apparatus, in which the power supply apparatus is supported on the body and located on a side of the body.

In one preferred embodiment of the present invention, the power supply apparatus is located on the side of the body. For this reason, the arrangement position of the power supply apparatus is lower than that in the case where the power supply apparatus is located above the body. As a result, the position of the center of gravity of the work vehicle is relatively low. As a result, the orientation of the work vehicle is stable.

That is, in one preferred embodiment of the present invention, the stability of the orientation of the work vehicle can be improved.

Furthermore, in one preferred embodiment of the present invention, it is preferable that the power supply apparatus is provided on one of lateral sides of the body.

Generally, in a work vehicle, a work apparatus is often provided at the body front portion or the body rear portion. For example, if the work vehicle is a combine, a reaper, which is a work apparatus, is provided at the body front portion. Also, if the work vehicle is a rice transplanter, a seedling planter apparatus, which is a work apparatus, is provided at the body rear portion.

For this reason, in a configuration in which the power supply apparatus is located on the body front side or the body rear side, a situation is envisioned in which the power supply apparatus interferes with the work apparatus.

Here, according to the above-described configuration, the power supply apparatus is provided on the lateral side on one side in the body left-right direction. Accordingly, even if the work apparatus is provided at the body front portion or the body rear portion, it is possible to realize a work vehicle in which the power supply apparatus is not likely to interfere with the work apparatus.

Furthermore, in one preferred embodiment of the present invention, it is preferable that the work vehicle further includes left and right travel apparatuses, in which the power supply apparatus is provided above and overlapping one of the left and right travel apparatuses on one side in the body left-right direction in a plan view.

According to this configuration, the power supply apparatus is easily compactly accommodated in a plan view, compared to a configuration in which the power supply apparatus does not overlap with the travel apparatus in a plan view. This makes it easy to realize a compact work vehicle while including a power supply apparatus.

Furthermore, in one preferred embodiment of the present invention, it is preferable that the travel apparatuses include front travel apparatuses and rear travel apparatuses, and the power supply apparatus is provided above and overlapping one of the front travel apparatuses on one side in the body left-right direction among the left and right front travel apparatuses in a plan view.

According to this configuration, the power supply apparatus is easily arranged on the lateral side of the body front portion. For this reason, if the electrically-powered apparatus is arranged on the lateral side of the body rear portion, it is possible to realize a work vehicle in which the power supply apparatus and the electrically-powered apparatus are not likely to interfere with each other.

Furthermore, in one preferred embodiment of the present invention, it is preferable that the power supply apparatus is provided toward a body center relative to a lateral outer end portion of the travel apparatuses in the body left-right direction.

According to this configuration, the power supply apparatus is less likely to interfere with a wall of a building, an obstacle, or the like, compared to the configuration in which the power supply apparatus protrudes laterally relative to the lateral outer end portion of the travel apparatus on one side in the body left-right direction. For this reason, it is easy to avoid a situation in which traveling is hindered due to the power supply apparatus interfering with the wall of the building, the obstacle, or the like.

Furthermore, in one preferred embodiment of the present invention, it is preferable that the work vehicle further includes an engine hood at a front portion of the body to accommodate an engine, and an exhaust grille at a lateral side portion of the engine hood to discharge cooling air after cooling the engine, wherein the power supply apparatus is provided on a lateral side of the exhaust grille.

According to this configuration, the power supply apparatus is cooled by the cooling air discharged from the exhaust grille of the engine hood. As a result, it is possible to realize a configuration in which the power supply apparatus is cooled without providing a dedicated cooling apparatus for cooling the power supply apparatus.

Furthermore, in one preferred embodiment of the present invention, it is preferable that the power supply apparatus includes an outer case including a first opening at a portion of the outer case opposing the exhaust grille and capable of receiving the cooling air, and a second opening at a portion of the outer case located on a side opposite to the first opening in a direction of approaching and moving away from the body.

According to this configuration, the power supply apparatus can be protected by the outer case. For this reason, it is easy to prevent obstacles and the like from interfering with the power supply apparatus. Moreover, according to this configuration, the cooling air is taken into the inside of the outer case via the first opening portion, and the cooling air after cooling the power supply apparatus is discharged from the second opening. As a result, the cooling air smoothly passes through the inside of the outer case, and therefore the power supply apparatus is effectively cooled by the cooling air.

Furthermore, in one preferred embodiment of the present invention, it is preferable that the work vehicle further includes a battery, an engine, and an engine hood at a front portion of the body to accommodate the engine and the battery, wherein the power supply apparatus is a converter to convert a voltage of electricity supplied from the battery into a needed voltage for the electricity apparatus, the power supply apparatus is provided on a lateral side of a portion of the engine hood that is rearward of a position at which the battery is provided in a body front-rear direction, and the electrically-powered apparatus is provided rearward of the power supply apparatus in the body front-rear direction, and on one side in the body left-right direction relative to a central position of the body in the body left-right direction.

According to this configuration, both the converter and the electrically-powered apparatus are provided on one side (the same side) in the body left-right direction relative to the center position of the body. As a result, the layout of the wiring connecting the converter and the electrically-powered apparatus is simpler compared to the configuration in which the electrically-powered apparatus is provided on the other side (different side) in the body left-right direction relative to the center position of the body. As a result, the manufacturing cost is likely to decrease.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a vertical cross-sectional front view showing a configuration of an air conditioner unit and the like.

FIG. 4 is a partially cutaway rear view showing the configuration of the air conditioner unit and the like.

FIG. 6 is a left side view showing the configuration of a converter and the like.

FIG. 7 is a left side view showing the configuration of the air conditioner unit and the like.

FIG. 8 is a left side view showing a configuration of a duct and the like.

FIG. 9 is a plan view showing the configuration of the duct and the like.

FIG. 11 is a partially cutaway plan view showing the configuration of the air conditioner unit and the like.

FIG. 12 is a plan view showing the configuration of the duct and the like.

FIG. 13 is a left side view showing a configuration of a duct support member and the like.

FIG. 14 is a bottom view showing the configuration of the duct support member and the like.

FIG. 17 is a vertical cross-sectional front view showing a configuration of a rear deck and the like.

FIG. 18 is a partially cutaway rear view showing the configuration of the rear deck and the like.

FIG. 19 is a front view showing the configuration of the front deck and the like.

FIG. 20 is a left side view showing the configuration of the front deck and the like.

FIG. 21 is a left side view showing the configuration of the rear deck and the like.

DETAILED DESCRIPTION OF THE PREFERRED EMBODIMENTS

First Preferred Embodiment

A first preferred embodiment of the present invention will be described with reference to the drawings. Note that in the following description, the direction of arrow F and the direction of arrow B shown in FIGS. 1, 2, 6 to 9, and 11 to 14 respectively are "front" and "rear", and the direction of arrow L and the direction of arrow R shown in FIGS. 2 to 5, 9 to 12, and 14 respectively are "left" and "right". Also, the direction of arrow U and the direction of arrow D shown in FIGS. 1, 3 to 8, 10, and 13, respectively are "up" and "down".

Figure 1:
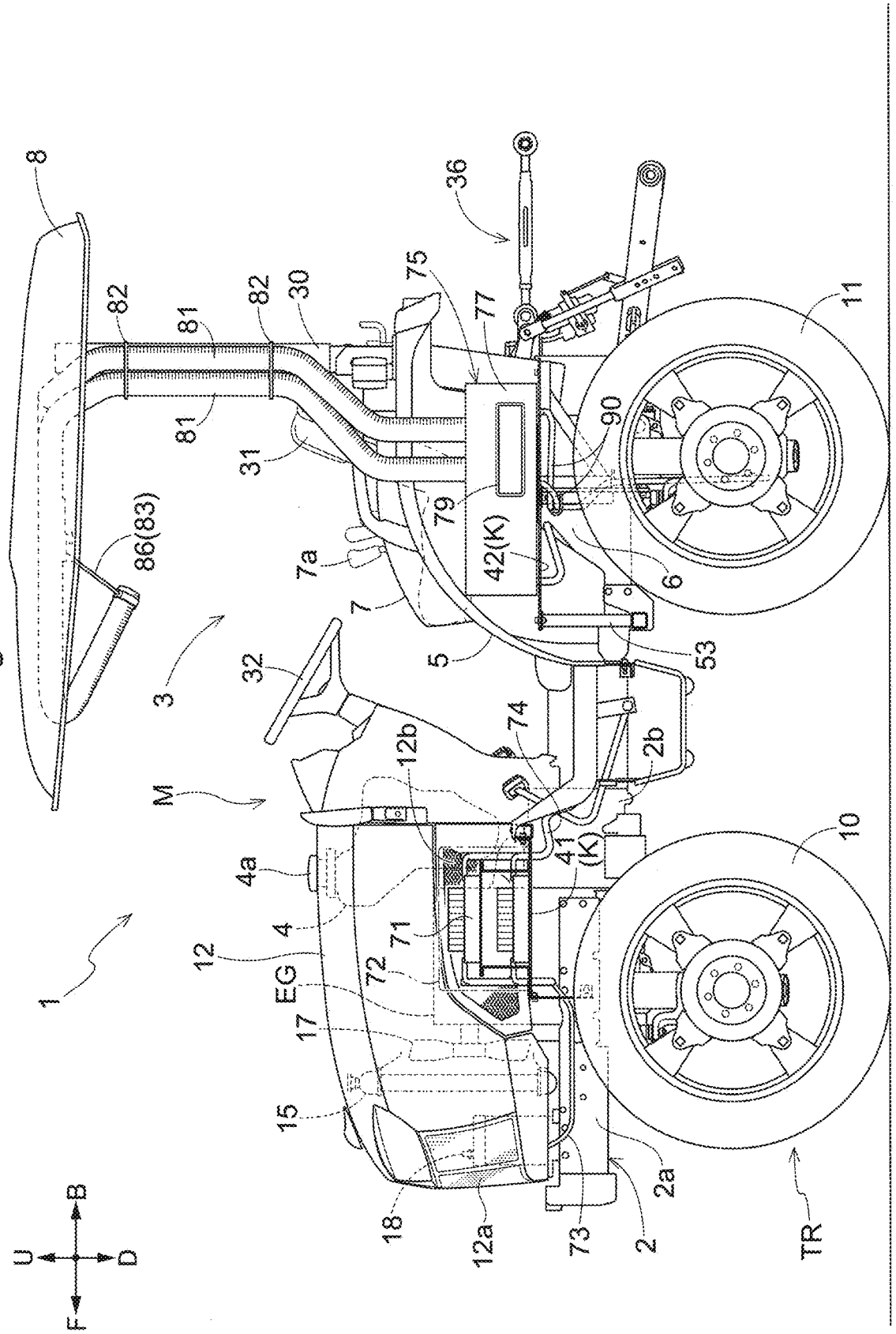
FIG. 1 is a diagram showing a first preferred embodiment of the present invention (hereinafter, the same applies to FIGS. 12 to 14), and is a left side view of the tractor.
Figure 2:
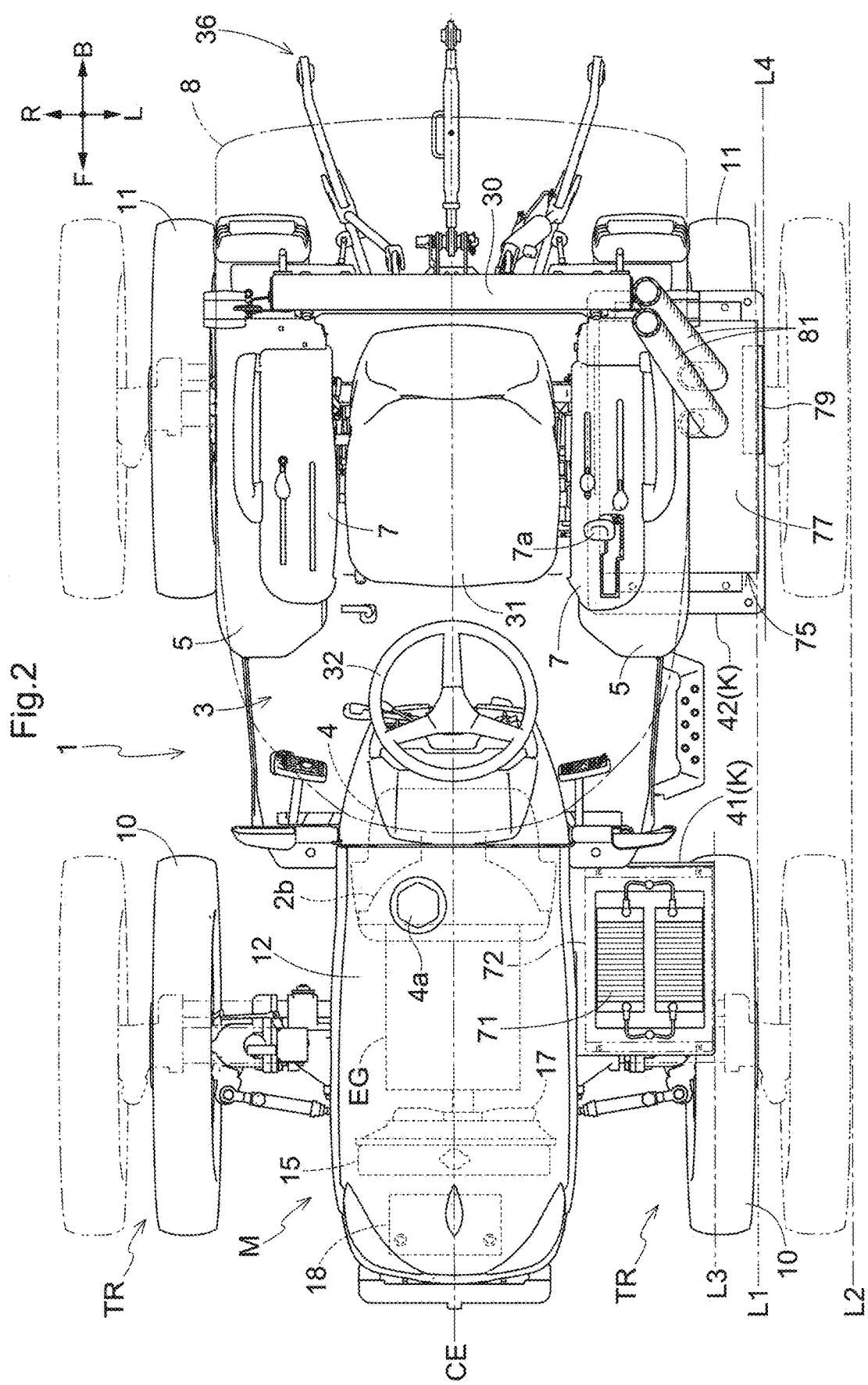
FIG. 2 is a plan view of the tractor.

As shown in FIGS. 1 and 2, the tractor 1 corresponding to a "work vehicle") includes a body frame 2, a main body M, and left and right travel apparatuses TR.

The body frame 2 extends in the body front-rear direction. Also, the body frame 2 is supported by the left and right travel apparatuses TR. Also, the body frame 2 supports the main body M. That is, the left and right travel apparatuses TR support the main body M via the body frame 2.

As described above, the tractor 1 includes the main body M supported by the body frame 2. Also, the tractor 1 includes the left and right travel apparatuses TR that support the main body M.

Note that the body of the tractor 1 includes the body frame 2 and the main body M. The body of the tractor 1 is supported by the left and right travel apparatuses TR.

Each travel apparatus TR includes a front wheel 10 corresponding to a "front travel apparatus") and a rear wheel 11 corresponding to a "rear travel apparatus" and a "wheel"). The front wheel 10 and the rear wheel 11 are both wheels.

That is, the travel apparatus TR is provided with the front wheel 10 and the rear wheel 11. Also, in the present preferred embodiment, the left and right travel apparatuses TR are the left and right front wheels 10 and the left and right rear wheels 11.

Also, the main body M includes a driver section 3 and an engine hood 12. That is, the driver section 3 is supported by the body frame 2. The engine hood 12 is arranged at the body front portion. Also, the driver section 3 is provided rearward of the engine hood 12.

The driver section 3 includes a driver seat 31 and a steering wheel 32. The driver can be seated in the driver seat 31. Then, the driver can perform various driving operations in the driver section 3. For example, by operating the steering wheel 32, the left and right front wheels 10 are steered.

As described above, the tractor 1 includes the driver section 3. Also, the driver section 3 is provided with the driver seat 31. In other words, the tractor 1 includes the driver section 3 including the driver seat 31.

As shown in FIG. 1, the engine hood 12 accommodates an engine EG, a fuel tank 4, a radiator 15, a cooling fan 17, and a battery 18 corresponding to a "power source".

In other words, in the tractor 1, the engine hood 12 for accommodating the engine EG is provided at the body front portion.

The fuel tank 4 stores fuel. A refueling portion 4a of the fuel tank 4 protrudes upward relative to the upper surface of the engine hood 12. Fuel can be replenished in the fuel tank 4 from the refueling portion 4a. The fuel stored in the fuel tank 4 is supplied to the engine EG.

Here, the body frame 2 has left and right main frames 2a and a motive power transmission apparatus 2b. Each main frame 2a is a plate-shaped member in a vertical orientation and extends in the body front-rear direction. The front portion of the motive power transmission apparatus 2b is fixed to the rear portions of the left and right main frames 2a. The motive power transmission apparatus 2b extends in the body front-rear direction. In the present preferred embodiment, the motive power transmission apparatus 2b has a hydrostatic continuously variable transmission. Also, a transmission 6 is supported at the rear end portion of the motive power transmission apparatus 2b.

Also, the driving force of the engine EG is transmitted to the transmission 6 via the motive power transmission apparatus 2b. The motive power transmission apparatus 2b and the transmission 6 change the driving force received from the engine EG and transmit the result driving force to the left and right front wheels 10 and the left and right rear wheels 11. As a result, the left and right front wheels 10 and the left and right rear wheels 11 are driven.

Also, a link mechanism 36 is provided at the rear end portion of the tractor 1. The link mechanism 36 is configured such that a work apparatus such as a tilling apparatus (not shown) can be attached thereto. Then, the transmission 6 transmits some of the driving force received from the engine EG to the work apparatus via a PTO shaft (not shown).

As described above, the tractor 1 includes the transmission 6 supported by the body frame 2.

According to the above-described configuration, the tractor 1 can perform work using the work apparatus while traveling using the left and right front wheels 10 and the left and right rear wheels 11. For example, in a ridged field, the tractor 1 can perform an intertillage task while traveling in a state in which the left and right front wheels 10 and the left and right rear wheels 11 are in the ridges.

The tractor 1 also includes a cooling water path to cool the engine EG. The radiator 15 is included in this cooling water path. A water pump (not shown) pumps the cooling water to circulate the cooling water in this cooling water path. Then, the cooling water is cooled by passing through the radiator 15.

The radiator 15 is located in front of the engine EG. The cooling fan 17 is arranged between the radiator 15 and the engine EG in the body front-rear direction.

Here, as shown in FIG. 1, the engine hood 12 includes an introduction portion 12a. The introduction portion 12a is configured such that outside air can be introduced into the inside of the engine hood 12. The introduction portion 12a is provided at the front end portion of the engine hood 12.

In the present preferred embodiment, the introduction portion 12a includes a plurality of small holes. However, the present invention is not limited to this, and the introduction portion 12a may be in any other form. For example, the introduction portion 12a may include one hole. Also, the introduction portion 12a may include an air blower for introducing outside air.

Also, the engine hood 12 includes left and right exhaust grille portions 12b. The left and right exhaust grille portions 12b are configured such that the air inside the engine hood 12 can be discharged to the outside.

The left exhaust grille portion 12b is provided on the left side portion of the engine hood 12. Also, the right exhaust grille portion 12b is provided on the right side portion of the engine hood 12.

The left exhaust grille portion 12b is located leftward of the engine EG. Also, the right exhaust grille 12b is located rightward of the engine EG. That is, the left and right exhaust grille portions 12b are located on the respective lateral sides of the engine EG.

In the present preferred embodiment, the left and right exhaust grille portions 12b each include a plurality of small holes. However, the present invention is not limited to this, and the left and right exhaust grille portions 12b may have any other form. For example, the left and right exhaust grille portions 12b may each include one hole. Also, the left and right exhaust grille portions 12b may include air blowers to discharge air.

The cooling fan 17 sends cooling air to the rear side. As a result, the outside air is introduced into the inside of the engine hood 12 via the introduction portion 12a and passes through the radiator 15. As a result, the radiator 15 is cooled.

At least some of the cooling air sent from the cooling fan 17 to the front portion of the engine EG wraps around to the left and right of the engine EG and is discharged from the left and right exhaust grille portions 12b. As a result, the front portion and the lateral side portions of the engine EG are cooled.

In this manner, the exhaust grille portions 12b to discharge the cooling air after cooling the engine EG are provided on the lateral side portions of the engine hood 12.

Also, the battery 18 stores electric power and is capable of supplying electric power to other apparatuses. The battery 18 is arranged frontward of the radiator 15.

As described above, the engine hood 12 to accommodate the engine EG and the battery 18 is provided at the front portion of the body.

Also, as shown in FIGS. 1 and 2, the main body M includes left and right fenders 5. As shown in FIG. 2, the left fender 5 is located leftward of the driver seat 31. The fender 5 on the right is located rightward of the driver seat 31.

As shown in FIG. 1, the left fender 5 is located above the left rear wheel 11 in a side view. Also, although not shown in FIG. 1, the right fender 5 is also located above the right rear wheel 11 in a side view.

That is, the tractor 1 is provided with left and right fenders 5 located above the travel apparatus TR in a side view.

As shown in FIG. 2, the left and right rear wheels 11 are provided in a state of protruding to the outer side in the body left-right direction relative to the left and right fenders 5. More specifically, the left rear wheel 11 is provided in a state of protruding to the left side relative to the left fender 5. Also, the right rear wheel 11 is provided in a state of protruding to the right side relative to the right fender 5.

That is, the travel apparatus TR is provided in a state of protruding to the outer side in the body left-right direction relative to the fenders 5.

As shown in FIGS. 1 and 2, the tractor 1 includes left and right side panels 7. The left side panel 7 is supported on the upper surface portion of the left fender 5 in a state of overlapping with the left fender 5 in a plan view. Also, the right side panel 7 is supported on the upper surface portion of the right fender 5 in a state of overlapping with the right fender 5 in a plan view.

Various operation levers are provided on the left and right side panels 7. In particular, as shown in FIG. 2, the left side panel 7 is provided with a speed change lever 7a. The speed change lever 7a is linked to the hydrostatic continuously variable transmission in the motive power transmission apparatus 2b. That is, due to the speed change lever 7a being operated, the speed change state in the motive power transmission apparatus 2b changes.

As shown in FIGS. 1 and 2, the tractor 1 is a cab-less machine (cabin-less machine). That is, the tractor 1 is not provided with a cabin. Also, the surrounding area of the driver seat 31 is open to the body exterior.

Also, the tractor 1 is provided with a gate-shaped protective frame 30. The protective frame 30 is provided in a standing manner from the rear portion of the driver section 3.

That is, the tractor 1 is provided with the protective frame 30 that is provided in a standing manner from the rear portion of the driver section 3.

Also, the tractor 1 includes a roof portion 8. The roof portion 8 is provided in a state of covering the driver section 3 from above.

That is, the tractor 1 includes the roof portion 8 that covers the driver section 3 from above.

In this preferred embodiment, the roof portion 8 is a canopy. Also, the roof portion 8 is supported on the upper portion of the protective frame 30.

Hereinafter, the structure of the portion connecting the body frame 2 and the left and right rear wheels 11 will be described with reference to FIGS. 3 and 4. Note that the following description also similarly applies to the structure of the portion connecting the body frame 2 and the left and right front wheels 10.

As described above, the transmission 6 is supported at the rear end portion of the body frame 2. Also, as shown in FIGS. 3 and 4, the tractor 1 includes left and right axle cases 20. The left axle case 20 connects the transmission 6 and the left rear wheel 11 to each other. Also, the right axle case 20 connects the transmission 6 and the right rear wheel 11 to each other.

That is, the tractor 1 is provided with the left and right axle cases 20 that respectively connect the transmission 6 and the left and right rear wheels 11.

The axle case 20 has a horizontal case portion 21 and a vertical case portion 22 corresponding to a "second support"). The horizontal case portion 21 extends toward the outer side in the body left-right direction from the transmission 6. More specifically, the left horizontal case portion 21 extends toward the left side from the transmission 6. Also, the right horizontal case portion 21 extends toward the right side from the transmission 6.

Figure 4:
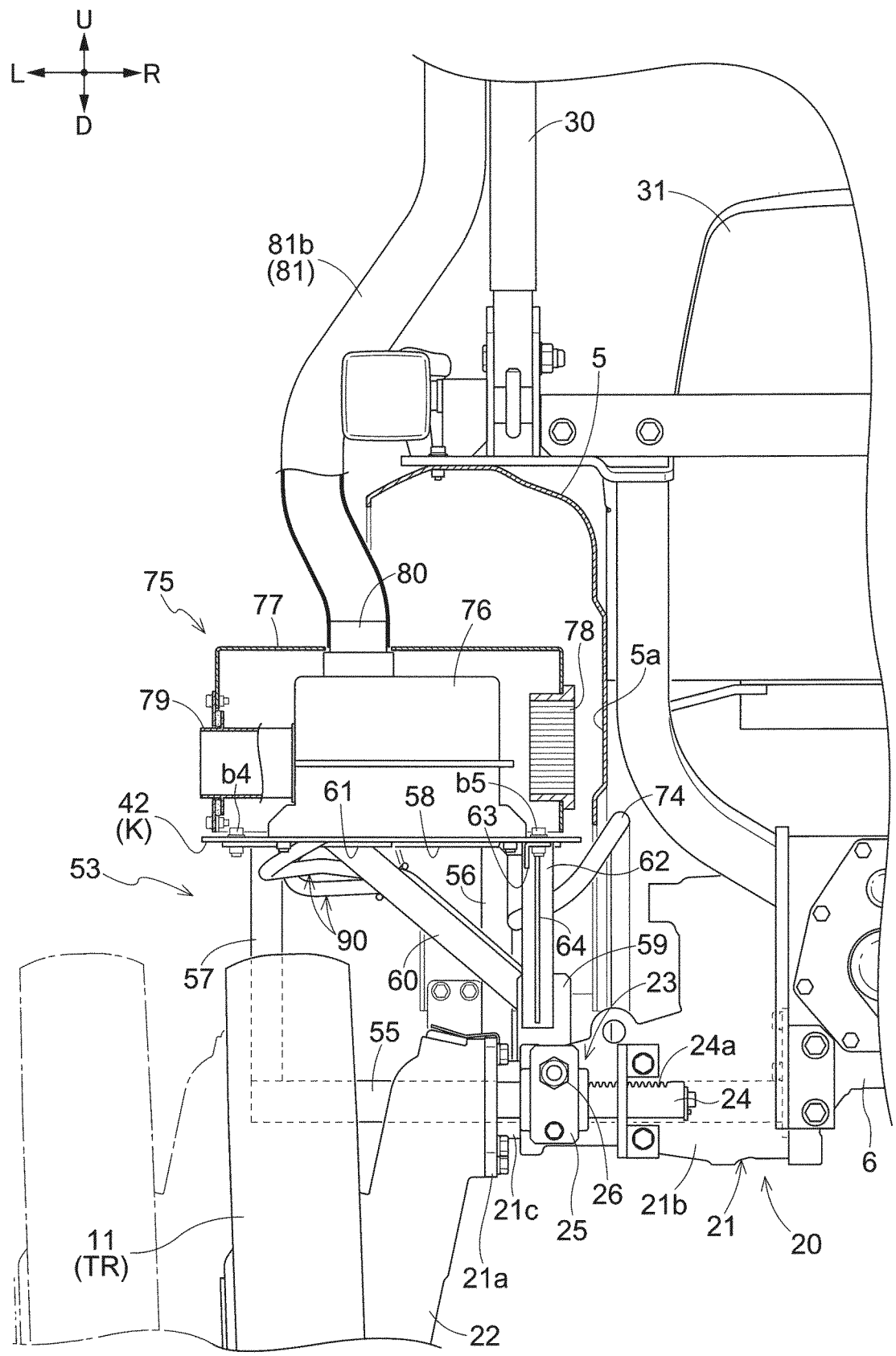

As shown in FIG. 4, the vertical case portion 22 extends downward from a free end portion 21a of the horizontal case portion 21. Also, the rear wheel 11 is supported at the lower end portion of the vertical case portion 22.

That is, the axle case 20 includes the horizontal case portion 21 that extends toward the outer side in the body left-right direction from the transmission 6 and the vertical case portion 22 that extends downward from the free end portion 21a of the horizontal case portion 21, and has a lower end portion on which the rear wheel 11 is supported.

Here, as shown in FIG. 4, the horizontal case portion 21 includes a case main body 21b and a slide portion 21c. The case main body 21b is fixed to the transmission 6.

The slide portion 21c is formed in a cylindrical shape extending in the body left-right direction. Also, the slide portion 21c is provided in a state of being inserted into the case main body 21b from the outer side in the body left-right direction. Also, the slide portion 21c can slide in the body left-right direction with respect to the case main body 21b.

Note that the above-described free end portion 21a is an end portion on the outer side in the body left-right direction of the slide portion 21c.

Also, the horizontal case portion 21 is provided with a tread changing apparatus 23. The tread changing apparatus 23 is capable of changing the extension length of the horizontal case portion 21.

That is, the tread changing apparatus 23 is provided in the horizontal case portion 21 and is configured to change the extension length of the horizontal case portion 21.

More specifically, the tread changing apparatus 23 includes an operation shaft 24, a shaft holding portion 25, and an operating nut 26. The operation shaft 24 extends in the body left-right direction and is provided in a state of extending between the case main body 21b and the slide portion 21c.

The shaft holding portion 25 is fixed to the case main body 21b. Also, the end portion on the outer side in the body left-right direction of the operation shaft 24 is coupled to the slide portion 21c. Also, the operation shaft 24 is provided in a state of extending through the shaft holding portion 25 in the left-right direction.

A plurality of rack gear teeth 24a are formed on the upper surface of the operation shaft 24. The plurality of rack gear teeth 24a are arranged in the longitudinal direction of the operation shaft 24. Also, a pinion gear (not shown) is provided inside the shaft holding portion 25. This pinion gear engages with the plurality of rack gear teeth 24a.

The operating nut 26 is provided on the shaft holding portion 25. The operating nut 26 is linked to the above-described pinion gear. Due to the operating nut 26 being rotated, the pinion gear rotates. In response to this, the operation shaft 24 moves in the body left-right direction. As a result, the slide portion 21c slides in the body left-right direction with respect to the case main body 21b, in one piece with the operation shaft 24. As a result, the extension length of the horizontal case portion 21 changes.

Figure 3:
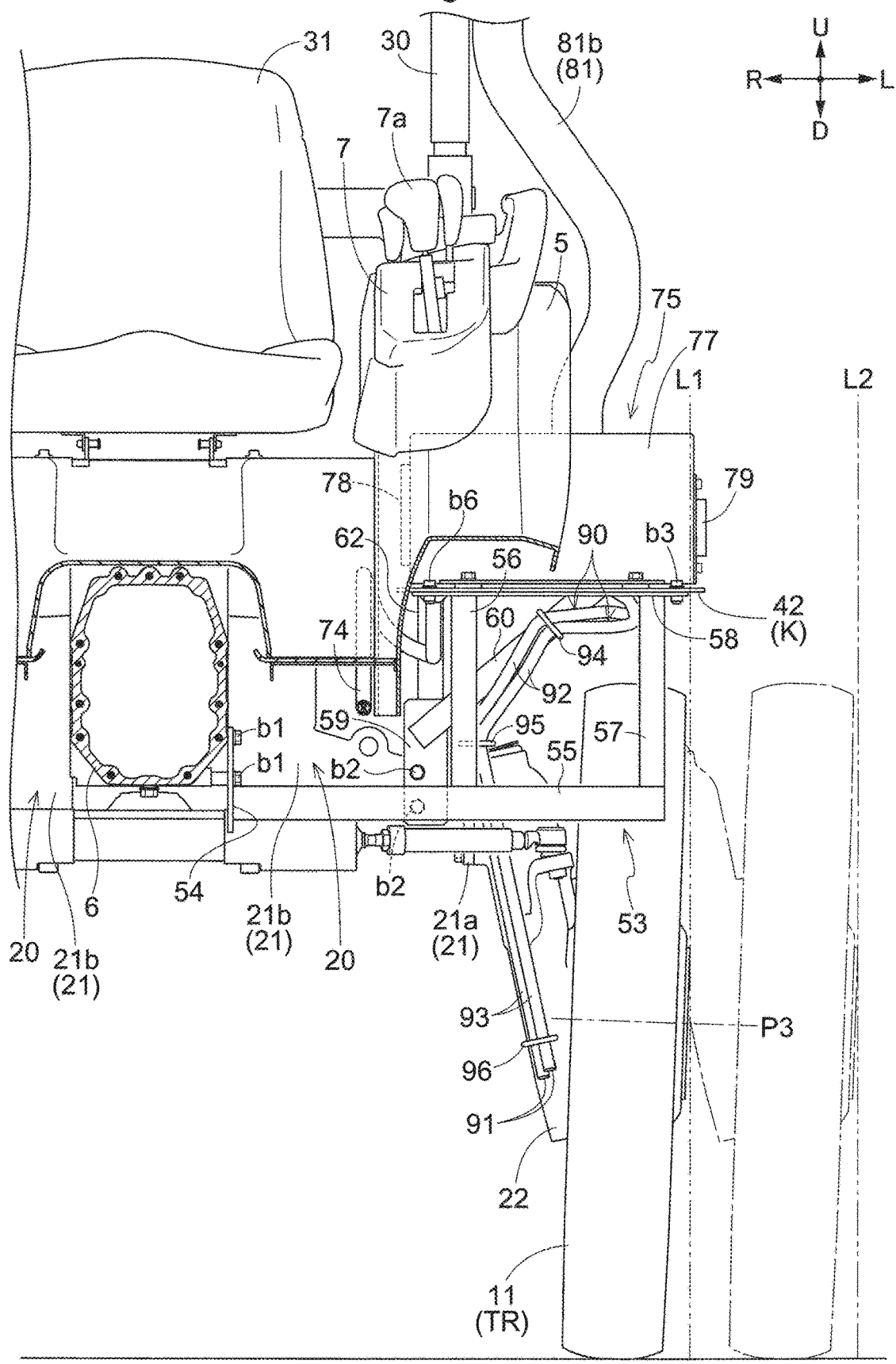

As the extension length of the horizontal case portion 21 changes, the left and right rear wheels 11 move in the left-right direction with respect to the transmission 6, as shown in FIGS. 2 to 4. That is, as the extension length of the horizontal case portion 21 changes, the left and right rear wheels 11 move in the left-right direction with respect to the body frame 2. As a result, the tread of the left and right rear wheels 11 changes. That is, the tread changing apparatus 23 changes the tread of the left and right rear wheels 11. Similarly, the tread of the left and right front wheels 10 are also changed by the corresponding tread changing apparatus 23.

That is, the tractor 1 includes a tread changing apparatus 23 that changes the tread of the left and right travel apparatuses TR by moving the travel apparatuses TR in the body left-right direction with respect to the body frame 2.

In this manner, the tractor 1 is provided with the driver section 3, the body frame 2 that supports the driver section 3, the left and right travel apparatuses TR that support the body frame 2, and the tread changing apparatus 23 that changes the tread of the left and right travel apparatuses TR by moving the travel apparatuses TR in the body left-right direction with respect to the body frame 2.

Note that in FIGS. 2 to 5, the left and right travel apparatuses TR or the left travel apparatus TR in the state where the tread is narrowest are indicated by solid lines. Also, the left and right travel apparatuses TR or the left travel apparatus TR in the state where the tread is widest are indicated by virtual lines.

As shown in FIGS. 1 and 2, the tractor 1 is provided with a plurality of decks K. Each deck K has a plate shape in a horizontal orientation. In the present preferred embodiment, the number of decks K provided is two. However, the present invention is not limited thereto, and the number of decks K provided may be one or three or more.

The plurality of decks K include a front deck 41 and a rear deck 42 corresponding to a "first support" and an "upper support"). That is, both the front deck 41 and the rear deck 42 are the decks K.

Both the front deck 41 and the rear deck 42 protrude to the body outer side relative to the main body M. More specifically, both the front deck 41 and the rear deck 42 protrude to the left side relative to the main body M. Also, both the front deck 41 and the rear deck 42 are provided on the lateral side on the body left side corresponding to "one side in the body left-right direction").

That is, the tractor 1 is provided with decks K that protrude to the body outer side relative to the main body M. Also, the decks K are provided on one lateral side in the body left-right direction.

FIG. 2 shows a first left end position L1, a second left end position L2, a third left end position L3, and a fourth left end position L4. The first left end position L1 is the position of the left end of the left travel apparatus TR in the state where the tread is narrowest. The second left end position L2 is the position of the left end of the left travel apparatus TR in the state where the tread is widest. The third left end position L3 is the position of the left end of the front deck 41. The fourth left end position L4 is the position of the left end of the rear deck 42.

As shown in FIG. 2, the first left end position L1 is located on the body right side relative to the second left end position L2. That is, the first left end position L1 is located closer to the body center in the body left-right direction than the second left end position L2 is.

Also, the third left end position L3 is located on the body right side relative to the first left end position L1. That is, the third left end position L3 is located closer to the body center in the body left-right direction than the first left end position L1 is. In other words, the lateral outer end of the front deck 41 is located closer to the body center in the body left-right direction than the lateral outer end of the left travel apparatus TR in the state where the tread is narrowest.

That is, the front deck 41, which is a deck K, is provided toward the body center in the body left-right direction relative to the lateral outer end portion of the travel apparatus TR on one side in the body left-right direction.

Also, the fourth left end position L4 is located on the body left side relative to the first left end position L1. That is, the fourth left end position L4 is located on the body outer side in the body left-right direction relative to the first left end position L1. In other words, the lateral outer end of the rear deck 42 is located on the body outer side in the body left-right direction relative to the lateral outer end portion of the left travel apparatus TR in the state where the tread is narrowest.

Also, the fourth left end position L4 is located on the body right side relative to the second left end position L2. That is, the fourth left end position L4 is located toward the body center in the body left-right direction relative to the second left end position L2. In other words, the lateral outer end of the rear deck 42 is located toward the body center in the body left-right direction relative to the lateral outer end portion of the left travel apparatus TR in the state where the tread is widest.

That is, the rear deck 42, which is a deck K, is provided toward the body center in the body left-right direction relative to the lateral outer end portion of the travel apparatus TR on one side in the body left-right direction in the state where the tread of the left and right travel apparatuses TR is widest.

Note that the present invention is not limited to the above-described configuration. The rear deck 42, which is a deck K, may be provided toward the body center in the body left-right direction relative to the lateral outer end portion of the travel apparatus TR on one side in the body left-right direction in the state where the tread of the left and right travel apparatuses TR is narrowest.

As shown in FIG. 1, both the front deck 41 and the rear deck 42 are provided at positions higher than the travel apparatuses TR.

That is, the decks K are provided at positions higher than the travel apparatuses TR.

As shown in FIG. 2, the front deck 41 is provided above the front wheel 10 on the body left side in a state of overlapping with the front wheel 10 on the body left side in a plan view when the tread of the left and right travel apparatuses TR is narrowest. Also, the rear deck 42 is provided above the rear wheel 11 on the body left side in a state of overlapping with the rear wheel 11 on the body left side in a plan view when the tread of the left and right travel apparatuses TR is narrowest.

That is, the plurality of decks K include the front deck 41, which is the deck K provided above the front wheel 10 on one side in the body left-right direction in a state of overlapping with the front wheel 10 on the one side in the body left-right direction among the left and right front wheels 10 in a plan view, and the rear deck 42, which is the deck K provided above the rear wheel 11 on the one side in the body left-right direction in a state of overlapping with the rear wheel 11 on the one side in the body left-right direction among the left and right rear wheels 11 in a plan view.

As shown in FIG. 2, the rear deck 42 is provided below the fender 5 on the body left side in a state of overlapping with the fender 5 on the body left side in a plan view.

That is, the rear deck 42, which is a deck K, is provided below the fender 5 on one side in the body left-right direction in a state of overlapping with the fender 5 on one side in the body left-right direction among the left and right fenders 5 in a plan view.

Also, as shown in FIGS. 1 and 2, the rear deck 42 is provided at a position between the rear wheel 11 on the body left side and the fender 5 on the body left side in the body vertical direction.

That is, the rear deck 42, which is a deck K, is provided at a position between the travel apparatus TR on one side in the body left-right direction and the fender 5 on the one side in the body left-right direction, in the body vertical direction.

In this preferred embodiment, each deck K is supported by the body frame 2. The support structure of each deck K will be described below.

Figure 5:
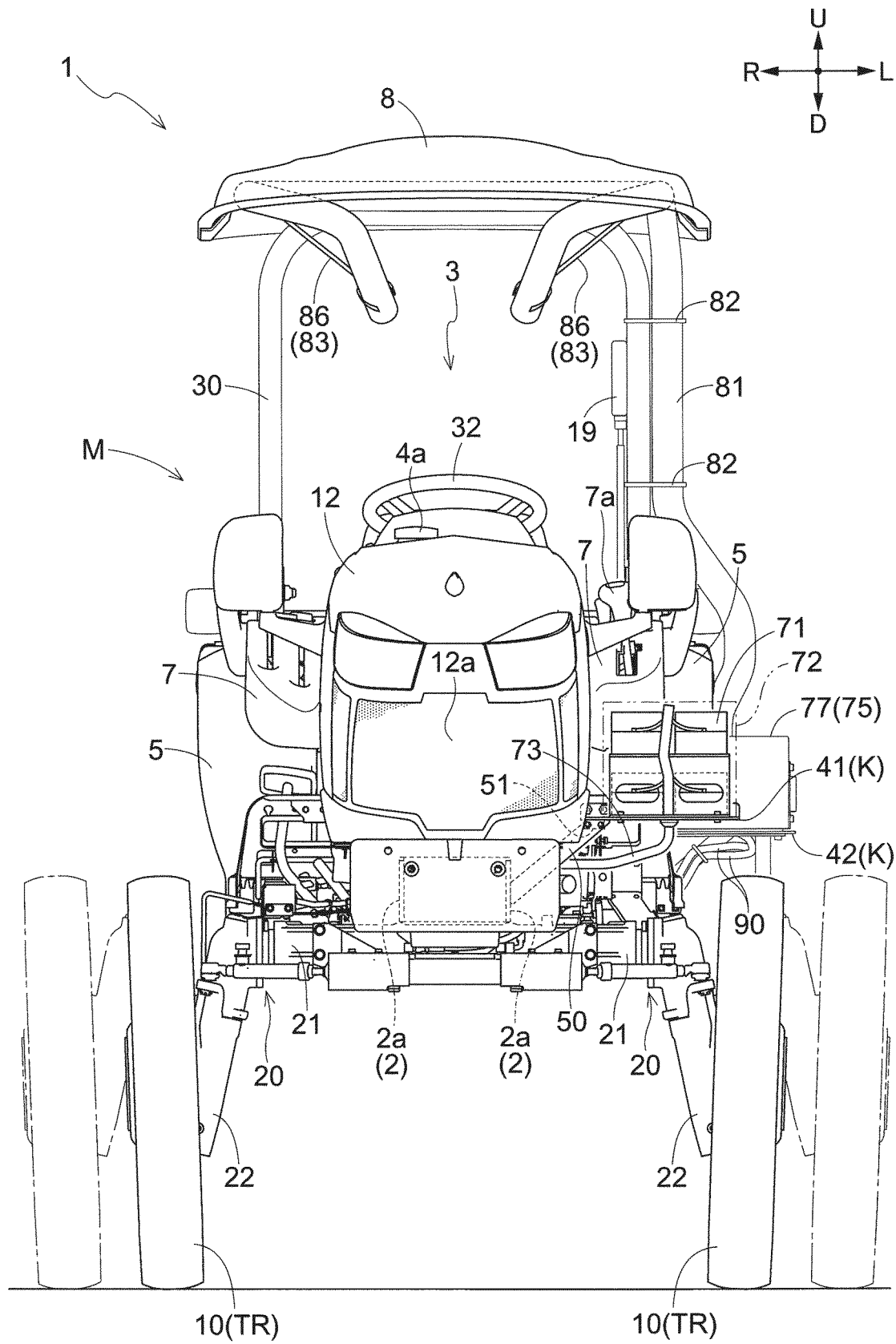
FIG. 5 is a front view of the tractor.
Figure 6:
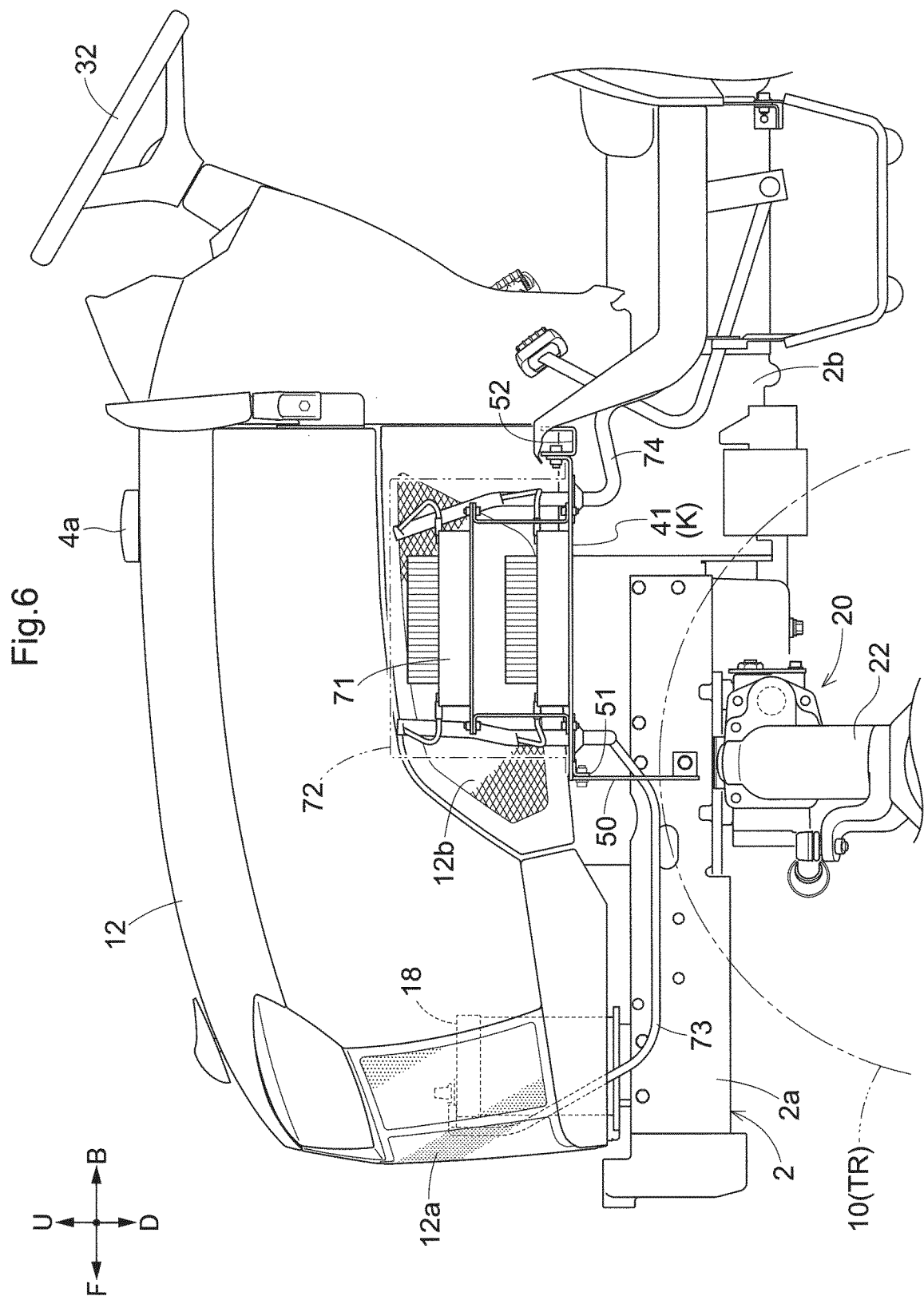

As shown in FIGS. 5 and 6, the tractor 1 includes a support stay 50, an L-shaped member 51, and a U-shaped member 52. The support stay 50 extends leftward and upward from the left side surface portion of the body frame 2.

The L-shaped member 51 is fixed to the lower surface at the front end portion of the front deck 41. Also, the lower end portion of the support stay 50 is fastened to the left main frame 2*a* by a bolt. Also, the upper end portion of the support stay 50 is fastened to the L-shaped member 51 by a bolt.

The U-shaped member 52 extends leftward from the left side surface portion of the body frame 2. The U-shaped member 52 is fixed to the left portion of the motive power transmission apparatus 2*b*. Also, the rear end portion of the front deck 41 is bent upward. The rear end portion of the front deck 41 is fastened by a bolt to the front side surface of the U-shaped member 52.

With the above-described configuration, the front portion of the front deck 41 is supported by the body frame 2 via the support stay 50 and the L-shaped member 51. Also, the rear portion of the front deck 41 is supported by the body frame 2 via the U-shaped member 52.

Figure 7:
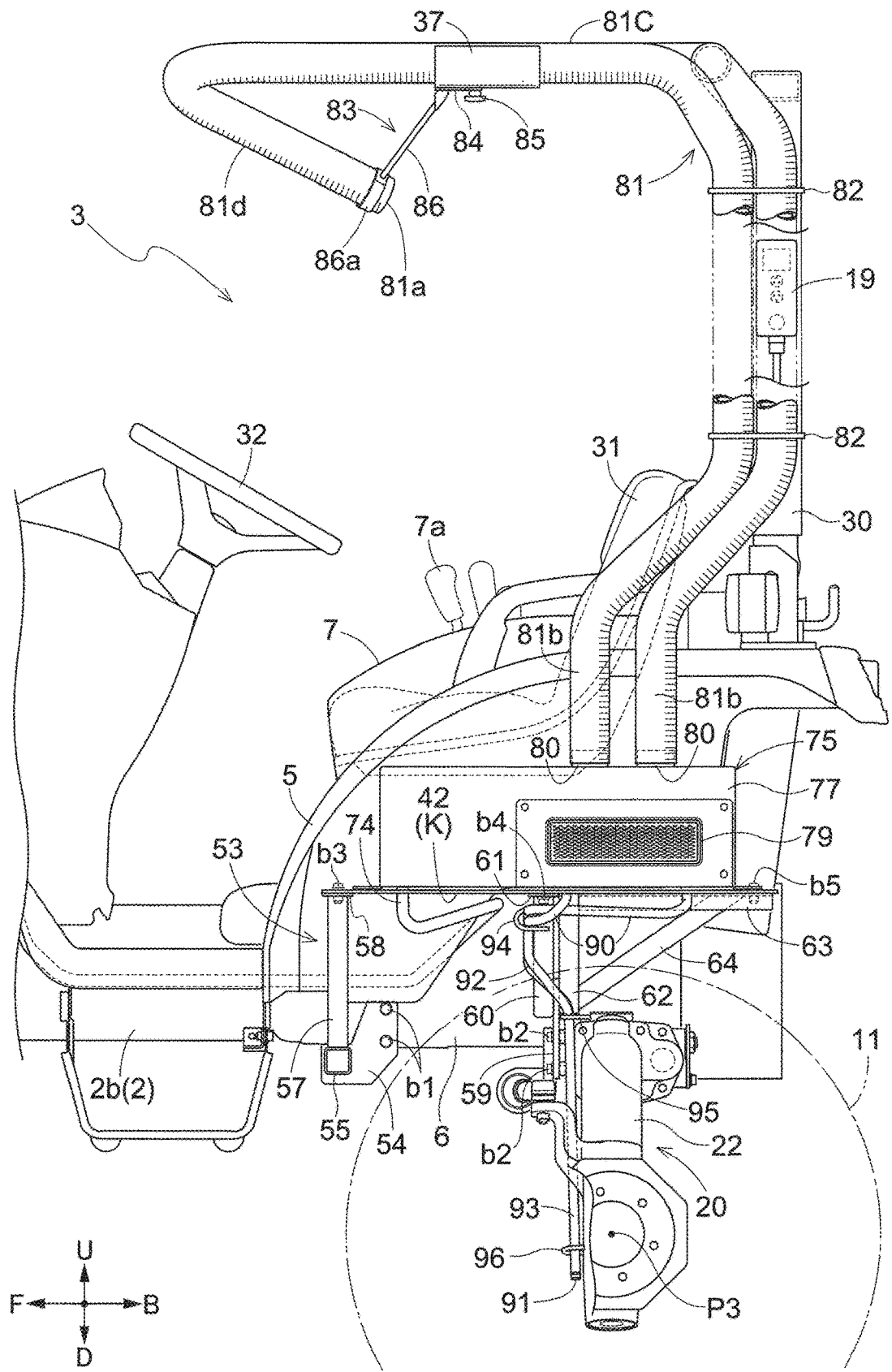

As shown in FIGS. 3, 4, and 7, the tractor 1 includes a support frame 53. The support frame 53 includes a first plate-shaped coupling portion 54, a first horizontal frame 55, a first vertical frame 56, a second vertical frame 57, and a second horizontal frame 58.

The first plate-shaped coupling portion 54 is a plate-shaped member in a vertical orientation. The first plate-shaped coupling portion 54 is fastened and fixed to the transmission 6 by a plurality of first fasteners b1 corresponding to a "fastener"). As a result, the first plate-shaped coupling portion 54 is fastened and fixed to the body frame 2 via the transmission 6.

Note that in the present preferred embodiment, the first fasteners b1 are bolts.

The first horizontal frame 55 extends in the body left-right direction. The first horizontal frame 55 is a tubular frame having a quadrangular cross section. The right end portion of the first horizontal frame 55 is welded and fixed to the left side surface of the first plate-shaped coupling portion 54.

The first vertical frame 56 extends in the body vertical direction. The lower end portion of the first vertical frame 56 is welded and fixed to the central portion in the body left-right direction of the first horizontal frame 55.

The second vertical frame 57 extends in the body vertical direction. The lower end portion of the second vertical frame 57 is welded and fixed to the left end portion in the body left-right direction of the first horizontal frame 55.

The second horizontal frame 58 extends in the body left-right direction between the first vertical frame 56 and the second vertical frame 57. The second horizontal frame 58 is a plate-shaped member in a horizontal orientation. The second horizontal frame 58 is welded and fixed to the upper end portion of the first vertical frame 56 and the upper end portion of the second vertical frame 57.

The second horizontal frame 58 is provided at a position opposing the lower surface of the front end portion of the rear deck 42. Also, the front portion of the rear deck 42 is supported by the second horizontal frame 58. That is, the front portion of the rear deck 42 is supported by the body frame 2 via the first plate-shaped coupling portion 54, the first horizontal frame 55, the first vertical frame 56, the second vertical frame 57, and the second horizontal frame 58.

As shown in FIGS. 3, 4, and 7, the support frame 53 includes a second plate-shaped coupling portion 59, a first diagonal frame 60, a third horizontal frame 61, a third vertical frame 62, a fourth horizontal frame 63, and a second diagonal frame 64.

The second plate-shaped coupling portion 59 is a plate-shaped member in a vertical orientation. The second plate-shaped coupling portion 59 is fastened and fixed to the case main body 21*b* in the horizontal case portion 21 corresponding to the rear wheel 11 on the body left side by a plurality of second fasteners b2 corresponding to a "fastener"). As a result, the second plate-shaped coupling portion 59 is fastened and fixed to the body frame 2 via the case main body 21*b*.

Note that in the present preferred embodiment, the second fasteners b2 are bolts.

The first diagonal frame 60 extends leftward and upward from the second plate-shaped coupling portion 59. The lower end portion of the first diagonal frame 60 is welded and fixed to the front side surface of the second plate-shaped coupling portion 59.

The third horizontal frame 61 extends in the body left-right direction. The third horizontal frame 61 is a plate-shaped member in a horizontal orientation. The third horizontal frame 61 is welded and fixed to the upper end portion of the first diagonal frame 60.

The third vertical frame 62 extends in the body vertical direction. The lower end portion of the third vertical frame 62 is welded and fixed to the rear side surface of the second plate-shaped coupling portion 59.

The fourth horizontal frame 63 extends in the body front-rear direction. The fourth horizontal frame 63 has an L-shaped cross section. The front end portion of the fourth horizontal frame 63 is welded and fixed to the rear side surface of the upper end portion of the third vertical frame 62.

The second diagonal frame 64 extends rearward and upward from the lower end portion of the third vertical frame 62. The lower end portion of the second diagonal frame 64 is welded and fixed to the rear side surface of the lower end portion of the third vertical frame 62. The upper end portion of the second diagonal frame 64 is welded and fixed to the rear portion of the fourth horizontal frame 63.

The third horizontal frame 61 is provided at a position opposing the lower surface at the central portion in the body front-rear direction of the rear deck 42. Also, the central portion in the body front-rear direction of the rear deck 42 is supported by the third horizontal frame 61. That is, the central portion in the body front-rear direction of the rear deck 42 is supported by the body frame 2 via the second plate-shaped coupling portion 59, the first diagonal frame 60, and the third horizontal frame 61.

The fourth horizontal frame 63 is provided at a position opposing the lower surface at the right portion of the rear portion of the rear deck 42. Also, the right portion of the rear portion of the rear deck 42 is supported by the fourth horizontal frame 63. That is, the right portion of the rear portion of the rear deck 42 is supported by the body frame 2 via the second plate-shaped coupling portion 59, the third vertical frame 62, the fourth horizontal frame 63, and the second diagonal frame 64.

With the configuration described above, the rear deck 42 is supported by the support frame 53. Also, the support frame 53 is supported by the body frame 2. Also, the support frame 53 is fastened and fixed to the body frame 2 by the plurality of first fasteners b1 and the plurality of second fasteners b2. Also, the support frame 53 can be removed from the body frame 2 by unfastening the plurality of first fasteners b1 and the plurality of second fasteners b2.

That is, the support frame 53 is fastened and fixed to the body frame 2 by the first fasteners b1 and the second fasteners b2, and is attachable to and detachable from the body frame 2.

As shown in FIGS. 3, 4, and 7, the rear deck 42 is fastened and fixed to the support frame 53 by a third fastener b3, a fourth fastener b4, a fifth fastener b5, and a sixth fastener b6. As a result, the rear deck 42 is coupled to the support frame 53.

More specifically, the front portion of the rear deck 42 is fastened and fixed to the second horizontal frame 58 by the third fastener b3 and the sixth fastener b6. Also, the central portion in the body front-rear direction of the rear deck 42 is fastened and fixed to the third horizontal frame 61 by the fourth fastener b4. Also, the right portion of the rear portion of the rear deck 42 is fastened and fixed to the fourth horizontal frame 63 by the fifth fastener b5.

Note that in the present preferred embodiment, the third fastener b3, the fourth fastener b4, the fifth fastener b5, and the sixth fastener b6 are all bolts.

Also, by unfastening the third fastener b3, the fourth fastener b4, the fifth fastener b5, and the sixth fastener b6, the rear deck 42 and the support frame 53 are uncoupled. As a result, the rear deck 42 can be removed toward the outside in the body left-right direction. In the present preferred embodiment, the rear deck 42 can be removed toward the body left side.

That is, the rear deck 42 can be removed toward the outside in the body left-right direction by uncoupling the rear deck 42 and the support frame 53.

As shown in FIG. 3, the position of the left end of the support frame 53 (the position of the left end of the second horizontal frame 58) substantially matches the first left end position L1. Also, the position of the left end of the support frame 53 (the position of the left end of the second horizontal frame 58) is located on the right side relative to the second left end position L2.

That is, the support frame 53 is arranged on the inner side in the body left-right direction relative to the rear wheel 11 on the body left side.

Also, as shown in FIGS. 3, 4, and 7, the support frame 53 is provided below the fender 5 on the body left side.

As described above, the support frame 53 to support the rear deck 42 is provided on the inner side in the body left-right direction of the travel apparatus TR on one side in the body left-right direction, and below the fender 5 on the one side in the body left-right direction.

Note that the present invention is not limited to the above-described configuration. The position of the left end of the support frame 53 (the position of the left end of the second horizontal frame 58) may be located on the right side relative to the first left end position L1 or on the left side relative to the first left end position L1.

Figure 8:
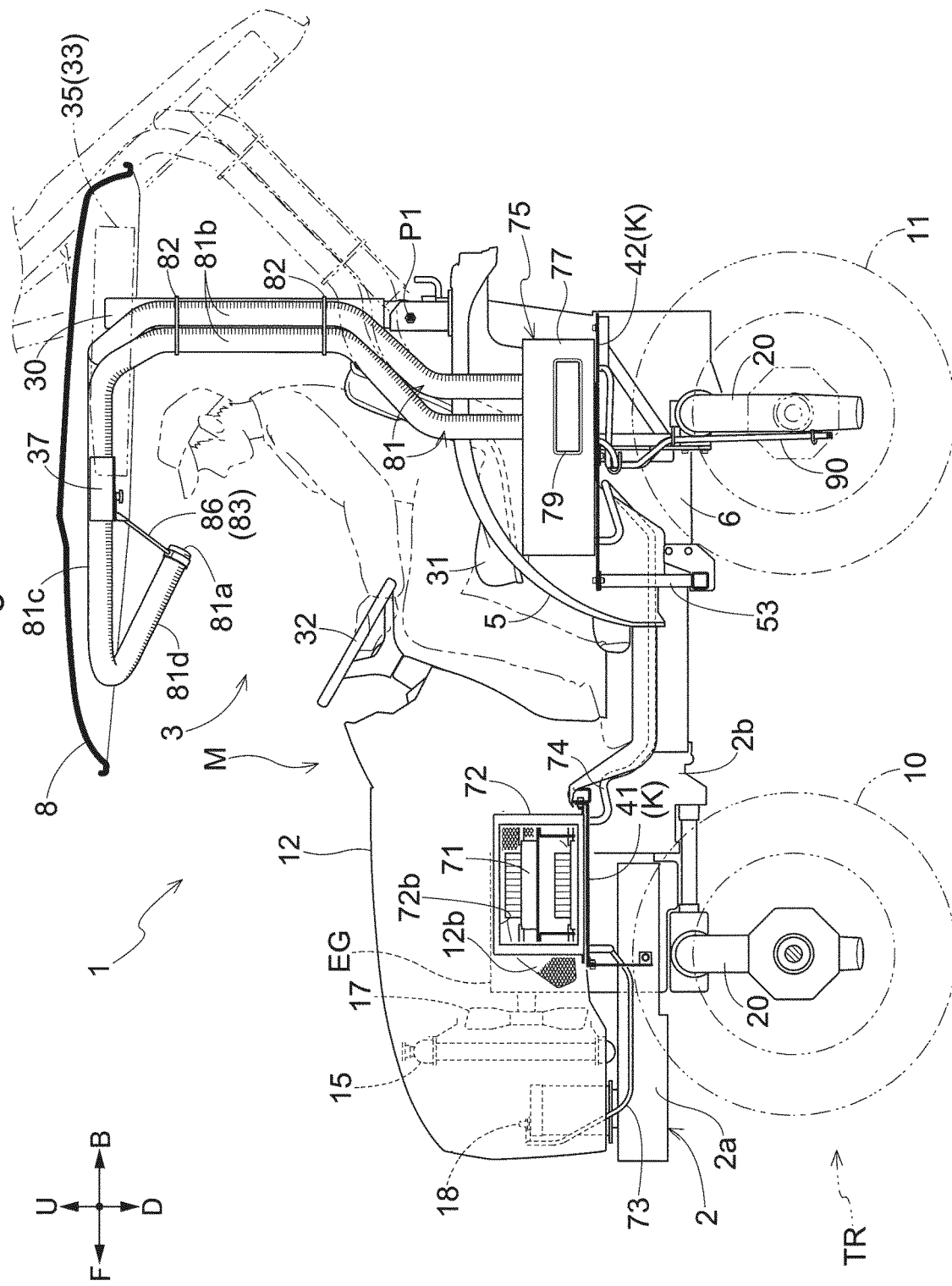
Figure 9:
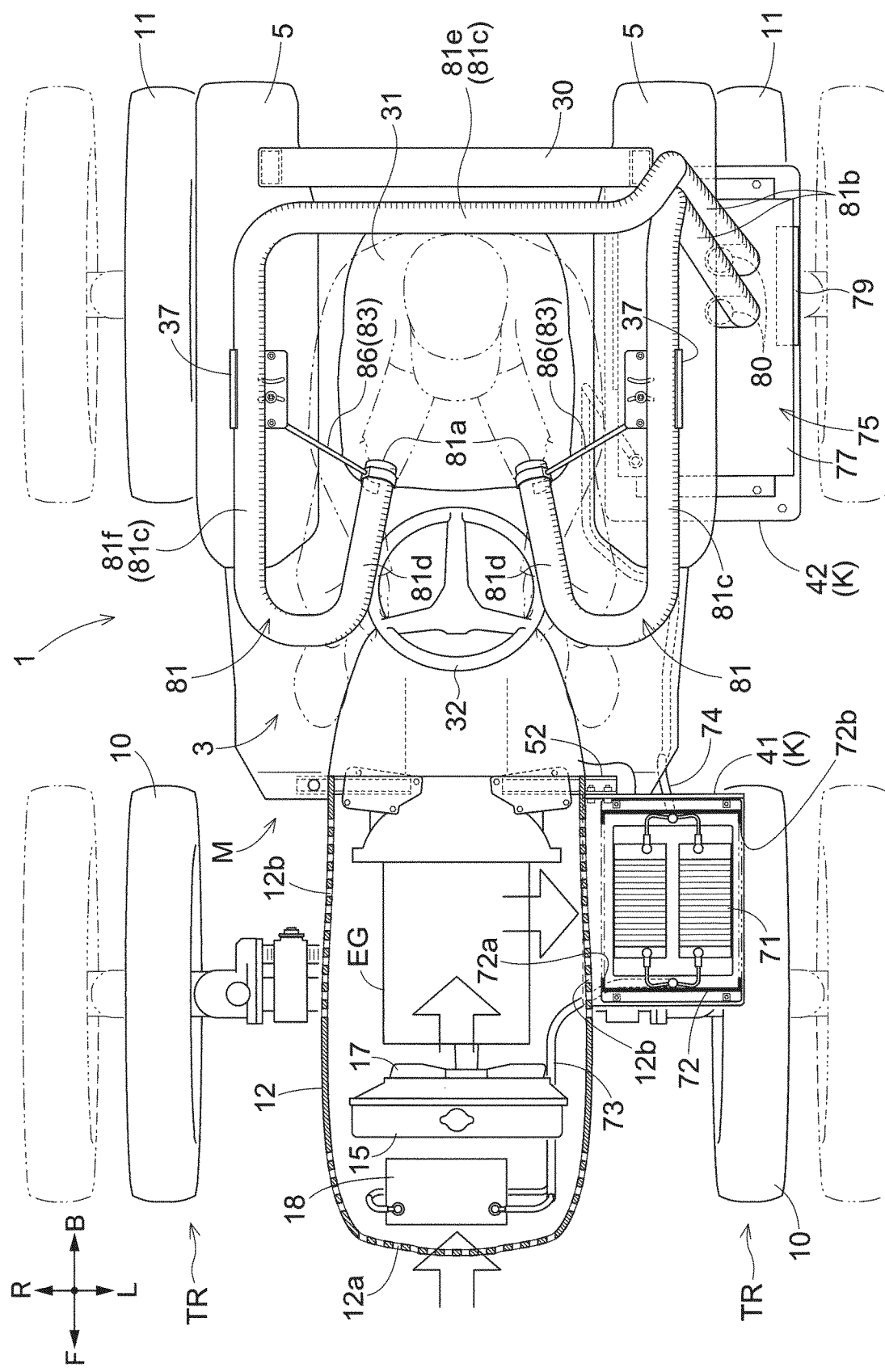

As shown in FIGS. 1 and 2, the tractor 1 includes a converter 71 corresponding to a "power supply apparatus") and an air conditioner unit 75 corresponding to an "electrically-powered apparatus"). As shown in FIGS. 8 and 9, the converter 71 is electrically connected to the battery 18 via a first harness 73. Also, the converter 71 is electrically connected to the air conditioner unit 75 via a second harness 74.

Electricity from the battery 18 is supplied to the converter 71 via the first harness 73. The converter 71 transforms the voltage of the electricity supplied from the battery 18 to the required voltage of the air conditioner unit 75. Then, the converter 71 supplies the transformed electricity to the air conditioner unit 75 via the second harness 74.

That is, the tractor 1 is provided with the battery 18 and the converter 71 that transforms the voltage of electricity supplied from the battery 18 to the required voltage of the air conditioner unit 75.

Note that in this preferred embodiment, the voltage of the battery 18 is lower than the required voltage of the air conditioner unit 75. The converter 71 steps up the voltage of electricity supplied from the battery 18.

However, the present invention is not limited to this. The voltage of the battery 18 may be higher than the required voltage of the air conditioner unit 75. Also, the converter 71 may be configured to step down the voltage of the electricity supplied from the battery 18.

The air conditioner unit 75 operates using the electricity supplied from the converter 71. The air conditioner unit 75 takes in air and adjusts the taken-in air. Then, the air conditioner unit 75 sends conditioned air to the driver section 3 through ducts 81.

As described above, the tractor 1 is provided with the air conditioner unit 75 for the driver section 3. Also, the tractor 1 is provided with the ducts 81 to supply the conditioned air from the air conditioner unit 75. In other words, the tractor 1 is provided with the ducts 81 that guide the air from the air conditioner unit 75 to the driver section 3. Also, the tractor 1 is provided with the air conditioner unit 75 that operates by being supplied with electricity from the converter 71.

The configuration of the converter 71 will be described hereinafter. Note that in FIGS. 9 and 10, the left and right travel apparatuses TR in the state where the tread is narrowest are indicated by solid lines. Also, the left and right travel apparatuses TR in the state in which the tread is widest are indicated by virtual lines.

As shown in FIGS. 1 and 2, the converter 71 is provided on the lateral side of the body left side of the tractor 1. That is, the converter 71 is provided on the lateral side on one side in the body left-right direction. As a result, the converter 71 is provided on the body left side relative to a central position CE (see FIG. 2) of the body.

That is, the converter 71 is provided on one side in the body left-right direction relative to the central position CE of the body in the body left-right direction.

In the present preferred embodiment, the converter 71 is provided with an outer case 72. However, the present invention is not limited to this, and the converter 71 need not include the outer case 72.

The converter 71 is supported by the front deck 41 in a state of being mounted on the upper surface of the front deck 41. As described above, the front deck 41 is supported by the body frame 2. That is, the converter 71 is supported by the body.

In this manner, the converter 71 is supported by the body in a state of being located on the side of the body.

As shown in FIGS. 1, 2, 8, and 9, the converter 71 is provided above the front wheel 10 on the body left side in a state of overlapping with the front wheel 10 on the body left side in a plan view when the tread of the left and right travel apparatuses TR is narrowest.

That is, the converter 71 is provided above the travel apparatus TR on one side in the body left-right direction in a state of overlapping with the travel apparatus TR on the one side in the body left-right direction of the left and right travel apparatuses TR in a plan view. Also, the converter 71 is provided above the front wheel 10 on the one side in the body left-right direction in a state of overlapping with the front wheel 10 on the one side in the body left-right direction among the left and right front wheels 10 in a plan view.

Also, as shown in FIG. 2, the converter 71 is located on the body right side relative to the first left end position L1. That is, the converter 71 is provided toward the body center relative to the lateral outer end portion of the travel apparatus TR in the body left-right direction.

As shown in FIGS. 1, 2, 8, and 9, the converter 71 is provided on the lateral side of the engine hood 12. More specifically, the converter 71 is provided on the lateral side of the portion of the engine hood 12 that is rearward relative to the position where the battery 18 is provided in the body front-rear direction.

Also, the converter 71 is provided leftward of the exhaust grille portion 12b on the body left side. That is, the converter 71 is provided on the lateral side of the exhaust grille portion 12b.

As shown in FIG. 9, the outer case 72 is provided with a first opening 72a and a second opening 72b. The first opening 72a is provided at a portion of the outer case 72 that opposes the exhaust grille portion 12b.

The second opening 72b is provided at a portion of the outer case 72 that is located on the side opposite to the first opening 72a in the direction of approaching and moving away from the body. More specifically, the second opening 72b is provided at a portion of the outer case 72 that is located on the side opposite to the first opening 72a in the body left-right direction.

That is, the second opening 72b is provided at the portion of the outer case 72 that is located on the side opposite to the first opening 72a in the direction of approaching and moving away from the body.

According to the configuration described above, the first opening 72a is provided in the right side wall of the outer case 72, and the second opening 72b is provided in the left side wall of the outer case 72.

In FIG. 9, the flow of the cooling air passing through the inside of the engine hood 12 is indicated by an arrow. As shown in FIG. 9, the air introduced into the inside of the engine hood 12 via the introduction portion 12a cools the engine EG as cooling air. Thereafter, at least some of the cooling air is discharged from the exhaust grille portion 12b on the body left side.

The cooling air discharged from the exhaust grille portion 12b on the body left side is introduced into the inside of the outer case 72 via the first opening 72a. The converter 71 is cooled by this cooling air. Thereafter, the cooling air is discharged from the second opening 72b.

That is, the portion of the exterior case 72 that faces the exhaust grille portion 12b is provided with a first opening 72a capable of receiving cooling air.

The configuration of the air conditioner unit 75 will be described hereinafter.

As shown in FIGS. 1 and 2, the air conditioner unit 75 is provided on the lateral side on the body left side. That is, the air conditioner unit 75 is provided on the lateral side on one side in the body left-right direction. As a result, the air conditioner unit 75 is provided on the body left side relative to the central position CE (see FIG. 2) of the body.

Also, the air conditioner unit 75 is provided on the rear side relative to the converter 71 in the body front-rear direction. More specifically, the air conditioner unit 75 is provided rearward of the converter 71.

That is, the air conditioner unit 75 is provided on the rear side relative to the converter 71 in the body front-rear direction, and on one side in the body left-right direction relative to the central position CE of the body in the body left-right direction.

The air conditioner unit 75 is supported by the rear deck 42 in a state of being mounted on the upper surface of the rear deck 42. That is, the air conditioner unit 75 is mounted on and supported by the rear deck 42. Also, as described above, the rear deck 42 is supported by the body frame 2. That is, the air conditioner unit 75 is supported by the body.

In this manner, the air conditioner unit 75 is supported by the body in a state of being located on the side of the body.

Figure 10:
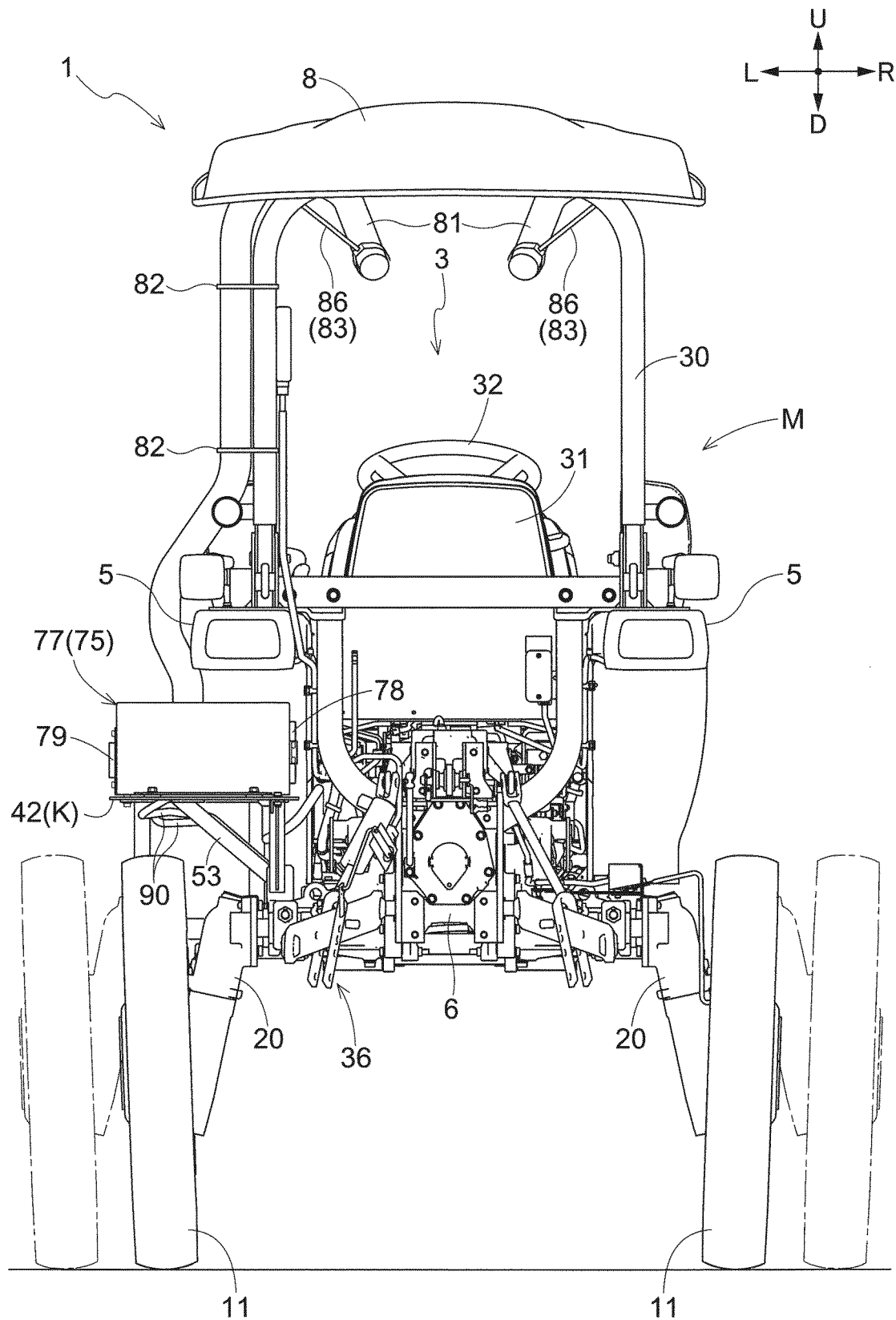
FIG. 10 is a rear view of the tractor.

As shown in FIGS. 1 and 10, the air conditioner unit 75 is provided at a position lower than the upper end portion of the driver seat 31. In other words, the air conditioner unit 75 is provided below the upper end of the driver seat 31.

Note that in the present preferred embodiment, the upper end position of the air conditioner unit 75 substantially matches the lower end position of the driver seat 31. However, the present invention is not limited to this, and the upper end position of the air conditioner unit 75 may be lower than the lower end position of the driver seat 31. That is, the air conditioner unit 75 may be provided below the lower end of the driver seat 31. Also, the upper end position of the air conditioner unit 75 may be above the lower end position of the driver seat 31. Also, the upper end position of the air conditioner unit 75 may be lower than the upper end position of the seat surface of the driver seat 31. The lower the upper end position of the air conditioner unit 75 is, the lower the position of the center of gravity of the tractor 1 is, which is preferable.

As shown in FIGS. 1, 2, 8, and 9, the air conditioner unit 75 is provided above the rear wheel 11 on the body left side in a state of overlapping with the rear wheel 11 on the body left side in a plan view when the tread of the left and right travel apparatuses TR is narrowest.

That is, the air conditioner unit 75 is provided above the travel apparatus TR on one side in the body left-right direction in a state of overlapping with the travel apparatus TR on the one side in the body left-right direction among the left and right travel apparatuses TR in a plan view. Also, the air conditioner unit 75 is provided above the rear wheel 11 on the one side in the body left-right direction in a state of overlapping with the rear wheel 11 on the one side in the body left-right direction among the left and right rear wheels 11 in a plan view.

Also, as shown in FIG. 2, the air conditioner unit 75 has a case portion 77 and an exhaust port 79. The case portion 77 has a box-shaped outer shape. Also, the left end position of the air conditioner unit 75 (the left end position of the exhaust port 79) substantially matches the fourth left end position L4.

That is, the lateral outer end of the air conditioner unit 75 is located on the body outer side in the body left-right direction relative to the lateral outer end portion of the left travel apparatus TR in the state where the tread is narrowest. Also, the lateral outer end of the air conditioner unit 75 is located toward the body center in the body left-right direction relative to the lateral outer end portion of the left travel apparatus TR in the state where the tread is widest.

As described above, in the state where the tread of the left and right travel apparatuses TR is widest, the air conditioner unit 75 is provided toward the body center in the body left-right direction relative to the lateral outer end portion of the travel apparatus TR on one side in the body left-right direction.

Note that the present invention is not limited to the above-described configuration. The air conditioner unit 75 may be provided toward the body center in the body left-right direction relative to the lateral outer end portion of the travel apparatus TR on one side in the body left-right direction in the state where the tread of the left and right travel apparatuses TR is narrowest.

As shown in FIG. 2, the air conditioner unit 75 is provided below the fender 5 on the body left side in a state of overlapping with the fender 5 on the body left side in a plan view.

That is, the air conditioner unit 75 is provided below the fender 5 on one side in the body left-right direction among the left and right fenders 5, in a state of overlapping with the fender 5 on the one side in the body left-right direction in a plan view.

Also, as shown in FIGS. 1 and 2, the air conditioner unit 75 is provided in a state of extending between a location above the rear wheel 11 on the body left side and a location below the fender 5 on the body left side.

That is, the air conditioner unit 75 is provided in a state of extending between a location above the travel apparatus TR on one side in the body left-right direction and a location below the fender 5 on the one side in the body left-right direction.

Also, as shown in FIGS. 2, 4, and 10, the air conditioner unit 75 protrudes to the body left side relative to the fender 5 on the body left side.

That is, the air conditioner unit 75 is provided in a state of protruding outward in the body left-right direction relative to the fender 5 on one side in the body left-right direction.

Figure 11:
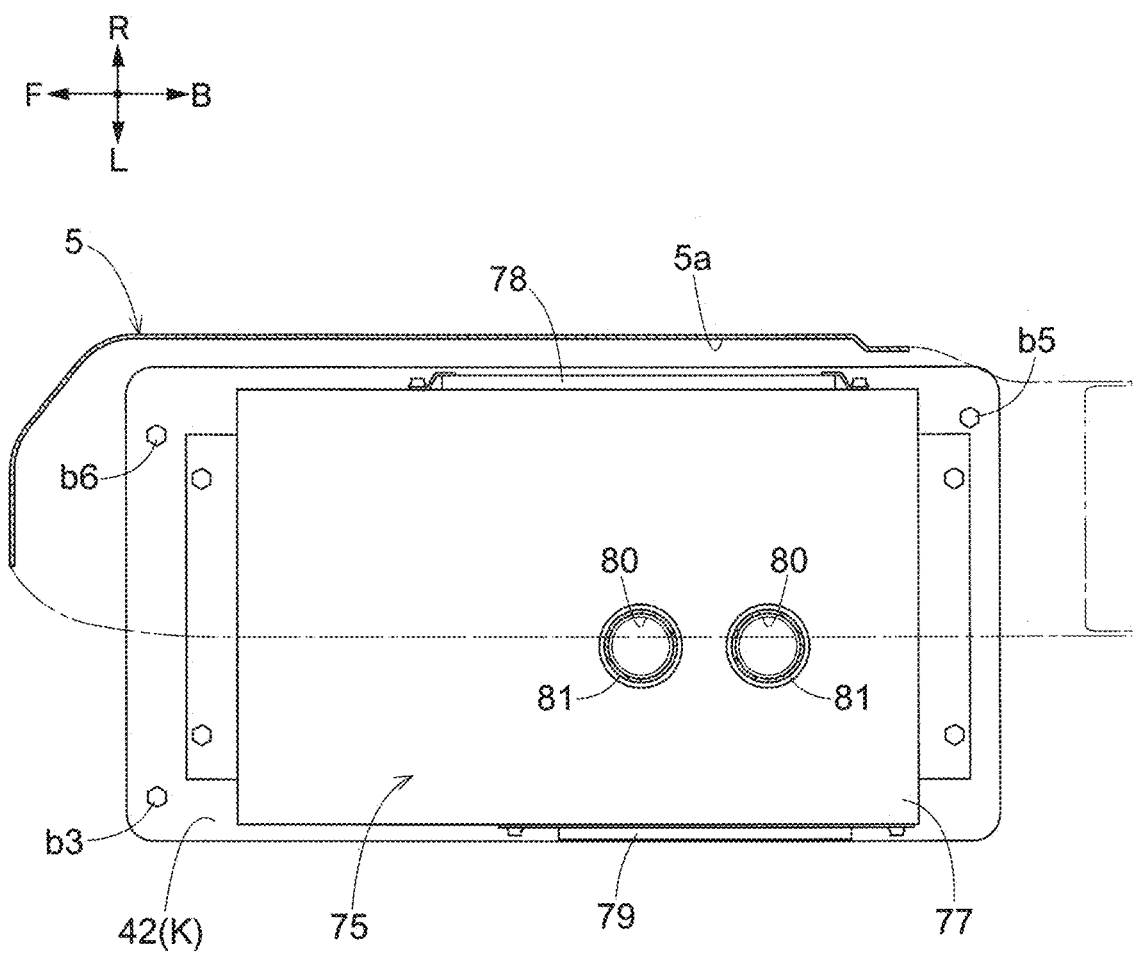

Also, as shown in FIGS. 4 and 11, the air conditioner unit 75 is provided with a connection portion 80. Note that in this preferred embodiment, two connection portions 80 are provided. However, the present invention is not limited to this, and the number of connection portions 80 provided may be one or three or more.

Each connection portion 80 is provided on the upper surface portion of the portion of the air conditioner unit 75 that protrudes from the fender 5 on the body left side. Also, the duct 81 is connected to each connection portion 80.

It should be noted that "each connection portion 80 is provided on the upper surface portion of the portion of the air conditioner unit 75 that protrudes from the fender 5 on the body left side" indicates that at least a portion of each connection portion 80 is provided on the upper surface portion of the portion of the air conditioner unit 75 that protrudes from the fender 5 on the body left side.

For example, as shown in FIG. 11, in the present preferred embodiment, the right side portions of the connection portions 80 are provided on the upper surface portion of the portion of the air conditioner unit 75 that is covered by the fender 5 on the body left side. Also, the remaining portions of the connection portions 80 are provided on the upper surface portion of the portion of the air conditioner unit 75 that protrudes from the fender 5 on the body left side. In the present specification, if at least a portion of the connection portion 80 is provided on the upper surface portion of the portion of the air conditioner unit 75 that protrudes from the fender 5 on the body left side in this manner, it is assumed that the connection portion 80 is "provided on the upper surface portion of the portion of the air conditioner unit 75 that protrudes from the fender 5 on the body left side."

In other words, in the present preferred embodiment, the connection portions 80 to which the ducts 81 are connected are provided on the upper surface portion of the portion of the air conditioner unit 75 that protrudes from the fender 5 on one side in the body left-right direction.

As shown in FIGS. 4 and 11, the air conditioner unit 75 includes a heat exchange portion 76 and an intake port 78. The heat exchange portion 76 is accommodated in the case portion 77.

That is, the air conditioner unit 75 is provided with the heat exchange portion 76 and the case portion 77 to accommodate the heat exchange portion 76.

As shown in FIG. 11, the intake port 78 is provided in a portion of the case portion 77 that faces the center of the body in a plan view. More specifically, the intake port 78 is provided in the right side wall of the case portion 77.

Also, the exhaust port 79 is provided in a portion of the case portion 77 on the side opposite to the intake port 78 in a plan view. More specifically, the exhaust port 79 is provided on the left side wall of the case portion 77.

The intake port 78 is configured such that outside air can be introduced into the inside of the case portion 77. Also, as shown in FIG. 4, the exhaust port 79 is connected to the heat exchange portion 76.

When the air conditioner unit 75 is operating, the heat exchange portion 76 takes in air via the intake port 78. Then, the heat exchange portion 76 adjusts the taken-in air by performing heat exchange. The heat exchange portion 76 sends the conditioned air to the ducts 81 via the connection portions 80. Also, the heat exchange portion 76 discharges the exhaust generated through the heat exchange via the exhaust port 79.

As described above, the intake port 78 corresponds to the heat exchange portion 76. That is, the intake port 78 for the heat exchange portion 76 is provided in the portion of the case portion 77 that faces the center of the body in a plan view.

As shown in FIGS. 4 and 11, the fender 5 on the body left side has a wall portion 5a. The wall portion 5a is provided at a position opposing the intake port 78. Also, the wall portion 5a is provided in a state of being spaced apart from the intake port 78.

As shown in FIG. 4, the wall portion 5a is provided in a state of extending over the vertical width (length) of the intake port 78. Also, as shown in FIG. 11, the wall portion 5a is provided in a state of extending over the lateral width of the intake port 78. Note that in the present preferred embodiment, the lateral width of the intake port 78 is the length of the intake port 78 in the body front-rear direction.

That is, at a position opposing the intake port 78, the wall portion 5a extending over the vertical width (length) of the intake port 78 and extending over the lateral width of the intake port 78 is provided in a state of being spaced apart from the intake port 78.

As shown in FIG. 7, the tractor 1 in the present preferred embodiment includes an operating apparatus 19. The operating apparatus 19 is supported by the protective frame 30. The driver seated in the driver seat 31 can operate the operating apparatus 19. The operating apparatus 19 may be capable of wirelessly communicating with the heat exchange portion 76, or may be capable of performing wired communication with the heat exchange portion 76.

Due to the operating apparatus 19 being operated, the operating state of the heat exchange portion 76 changes. For example, by operating the operating apparatus 19, the operation of the heat exchange portion 76 may be started or stopped, or the target temperature of the conditioned air sent from the heat exchange portion 76 to the driver section 3 can be set.

The configuration of the duct 81 will be described hereinafter.

As shown in FIGS. 7 to 9, the tractor 1 in the present preferred embodiment includes two ducts 81. However, the present invention is not limited to this, and the number of ducts 81 provided may be one or three or more.

Each duct 81 has an outlet 81a, a vertical portion 81b, a horizontal portion 81c, and a rear lowering portion 81d. The vertical portion 81b extends in the body vertical direction. The lower end portion of the vertical portion 81b is connected to the connection portion 80. Also, the vertical portion 81b extends upward from the air conditioner unit 75.

Also, the upper portion of the vertical portion 81b is extended upward at a position rearward of the driver seat 31.

The upper portion of the vertical portion 81b is fastened to the protective frame 30 by a plurality of duct holding members 82. Each duct holding member 82 is formed in an annular shape. Each duct holding member 82 is provided so as to bundle the two ducts 81 together with the protective frame 30.

The horizontal portion 81c extends in the horizontal direction from the upper end portion of the vertical portion 81b. The horizontal portion 81c extends from the upper end portion of the vertical portion 81b to a position frontward of the driver seated in the driver seat 31 in a side view. Also, as shown in FIG. 8, the horizontal portion 81c is configured to pass over the driver's head in a side view.

That is, the duct 81 is provided with the vertical portion 81b extending upward from the air conditioner unit 75 at a position rearward of the driver seat 31, and the horizontal portion 81c, which extends from the upper end portion of the vertical portion 81b to a position frontward of the driver seated in the driver seat 31 in a plan view.

Note that as shown in FIG. 9, in the present preferred embodiment, the horizontal portion 81c in one of the two ducts 81 is configured to pass through the left side of the driver in a plan view. Also, the horizontal portion 81c of the other of the two ducts 81 is configured to pass through the right side of the driver in a plan view.

In the following description, the horizontal portion 81c passing through the left side of the driver in a plan view is referred to as a left horizontal portion 81c. Also, the horizontal portion 81c passing through the right side of the driver in a plan view is referred to as a right horizontal portion 81c.

The left horizontal portion 81c extends frontward from the upper end portion of the vertical portion 81b. Also, the right horizontal portion 81c has a first portion 81e extending rightward from the upper end portion of the vertical portion 81b, and a second portion 81f extending frontward from the right end portion of the first portion 81e.

As shown in FIGS. 8 and 9, the rear lowering portion 81d extends rearward and downward from the front end portion of the horizontal portion 81c. Also, the outlet 81a is located at the leading end portion of the rear lowering portion 81d.

Also, the rear lowering portion 81d is located at the front end portion of the duct 81. That is, the outlet 81a is formed at the front end portion of the duct 81.

The rear lowering portion 81d is located frontward of the driver seated in the driver seat 31. The outlet 81a opposes the driver seated in the driver seat 31. Also, the conditioned air sent from the air conditioner unit 75 to the duct 81 passes through the vertical portion 81b, the horizontal portion 81c, and the rear lowering portion 81d, and is blown out from the outlet 81a toward the driver.

That is, the portion of the duct 81 that is located frontward of the driver is provided with an outlet 81a to blow conditioned air toward the driver.

In this preferred embodiment, the duct 81 is flexible. Although not particularly limited, the duct 81 may be a bellows-shaped cylinder made of polyethylene.

Here, the vertical portion 81b, which is a portion of the duct 81, is also flexible. Also, as described above, the upper portion of the vertical portion 81b is fastened to the protective frame 30 by the plurality of duct holding members 82. As a result, the vertical portion 81b is supported by the protective frame 30 in a state of extending along the protective frame 30.

That is, the vertical portion 81b is flexible and is supported by the protective frame 30 in a state of being attached to the protective frame 30.

As shown in FIG. 8, the protective frame 30 is swingable about a frame swing axis P1 extending in the body left-right direction. As a result, the orientation of the protective frame 30 can be changed between a use orientation and an inclined orientation. The use orientation is an upright orientation. The inclined orientation is an orientation in which the protective frame 30 is inclined rearward from the use orientation.

That is, the protective frame 30 is configured such that the orientation can be changed between an upright use orientation and an inclined orientation of inclining rearward from the use orientation.

The protective frame 30 and the roof portion 8 swing in one piece about the frame swing axis P1. For this reason, as the orientation of the protective frame 30 is changed, the orientation of the roof portion 8 also changes. Note that in FIG. 8, the protective frame 30 in the use orientation is indicated by solid lines. Also, the protection frame 30 in the inclined orientation is indicated by virtual lines.

Also, the vertical portion 81b deforms according to the change in the orientation of the protective frame 30.

Figure 12:
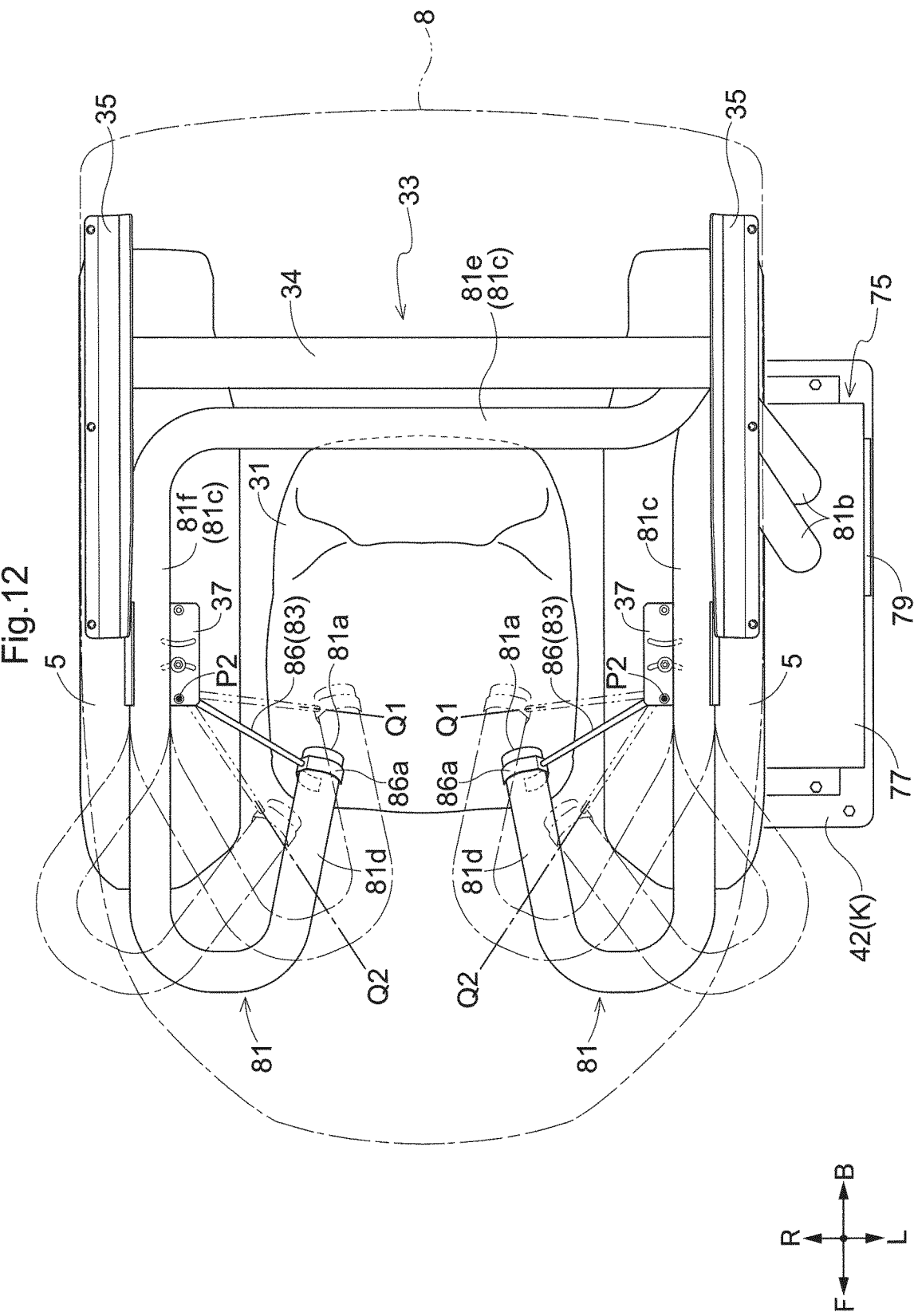

As shown in FIGS. 8 and 12, the tractor 1 includes a roof frame 33. The roof frame 33 includes a first frame 34 and left and right second frames 35. The first frame 34 extends in the body left-right direction. The first frame 34 is supported on the upper surface of the protective frame 30. That is, the first frame 34 is supported on the upper portion of the protective frame 30.

The left and right second frames 35 each extend in the body front-rear direction. The left second frame 35 is supported at the left end portion of the first frame 34. The right second frame 35 is supported at the right end portion of the first frame 34.

That is, the roof frame 33 is supported on the upper portion of the protective frame 30.

Also, the roof portion 8 is supported by the left and right second frames 35. That is, the tractor 1 is provided with the roof frame 33 that supports the roof portion 8.

As shown in FIGS. 8, 9, and 12, the tractor 1 includes left and right duct receiving portions 37. The left duct receiving portion 37 is welded and fixed to the front end portion of the left second frame 35. The left duct receiving portion 37 supports the left horizontal portion 81c from below. Also, the right duct receiving portion 37 is welded and fixed to the front end portion of the right second frame 35. The right duct receiving portion 37 supports the right horizontal portion 81c from below.

As shown in FIG. 12, the tractor 1 includes left and right duct support members 83. The left duct support member 83 is coupled to the left duct receiving portion 37. As a result, the left duct support member 83 is supported by the roof frame 33 via the left duct receiving portion 37.

Also, the right duct support member 83 is coupled to the right duct receiving portion 37. As a result, the right duct support member 83 is supported by the roof frame 33 via the right duct receiving portion 37. That is, the duct support member 83 is supported by the roof frame 33.

Figure 13:
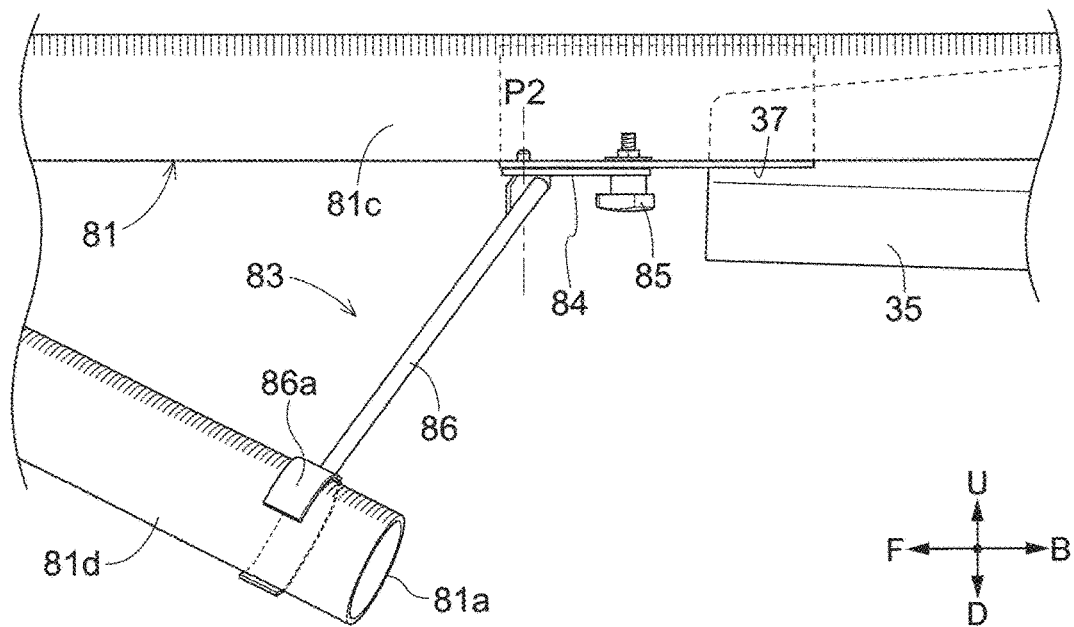
Figure 14:
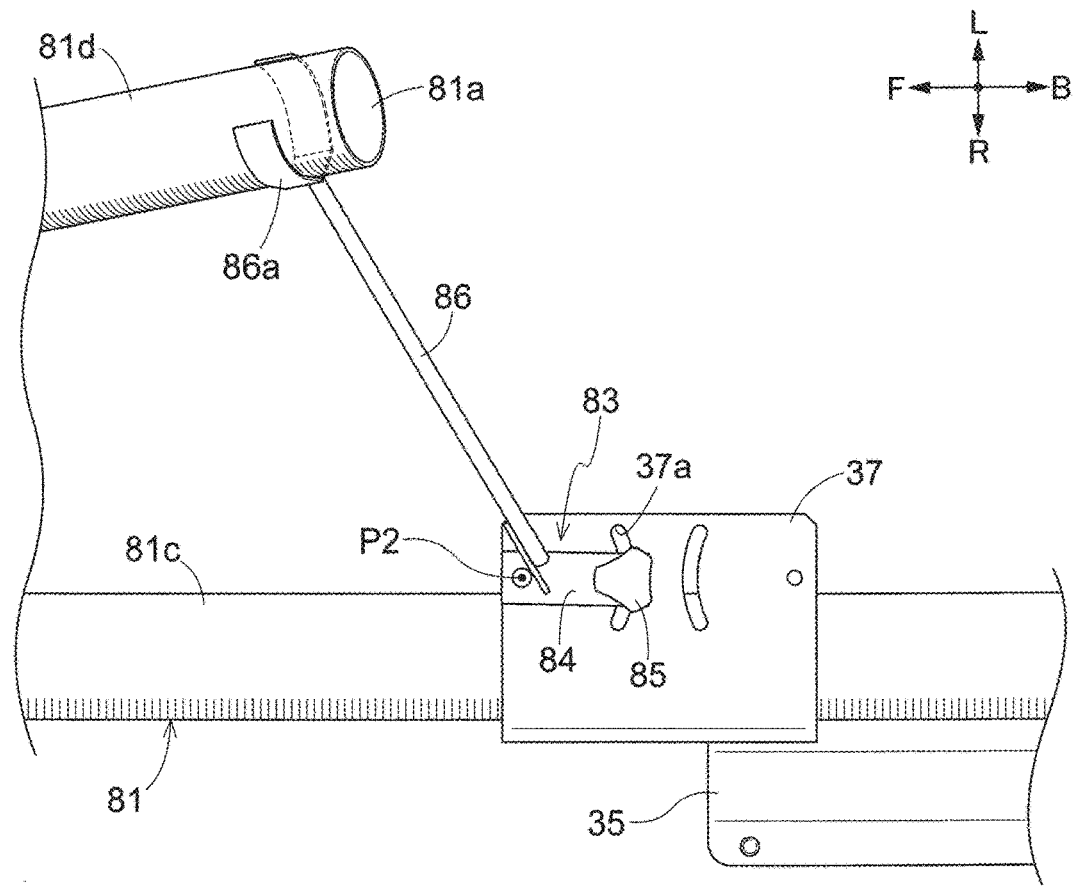
Figure 15:
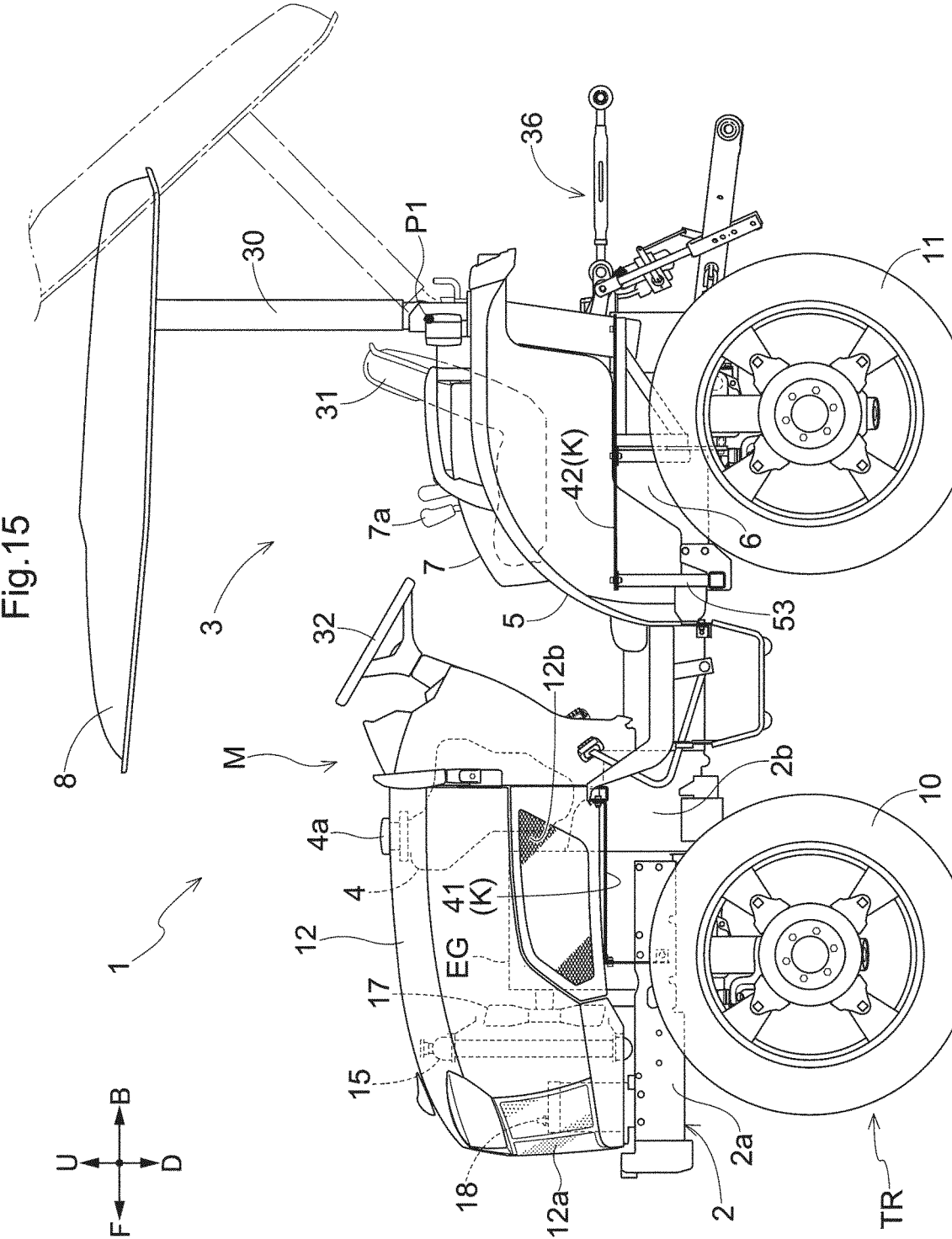
FIG. 15 is a diagram showing a second preferred embodiment of the present invention (hereinafter, the same applies to FIGS. 16 to 21), and is a left side view of the tractor.
Figure 16:
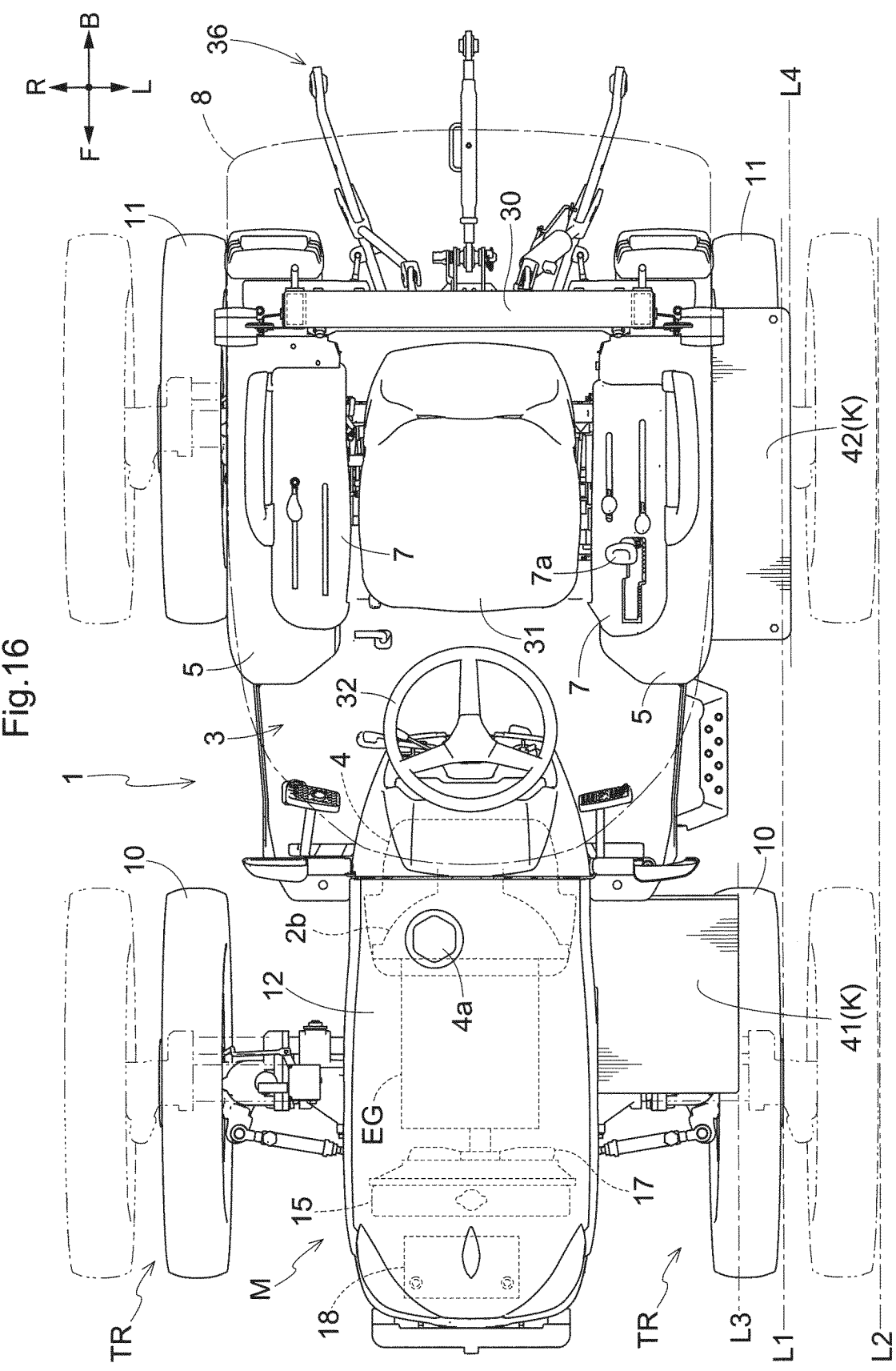
FIG. 16 is a plan view of the tractor.
Figure 17:
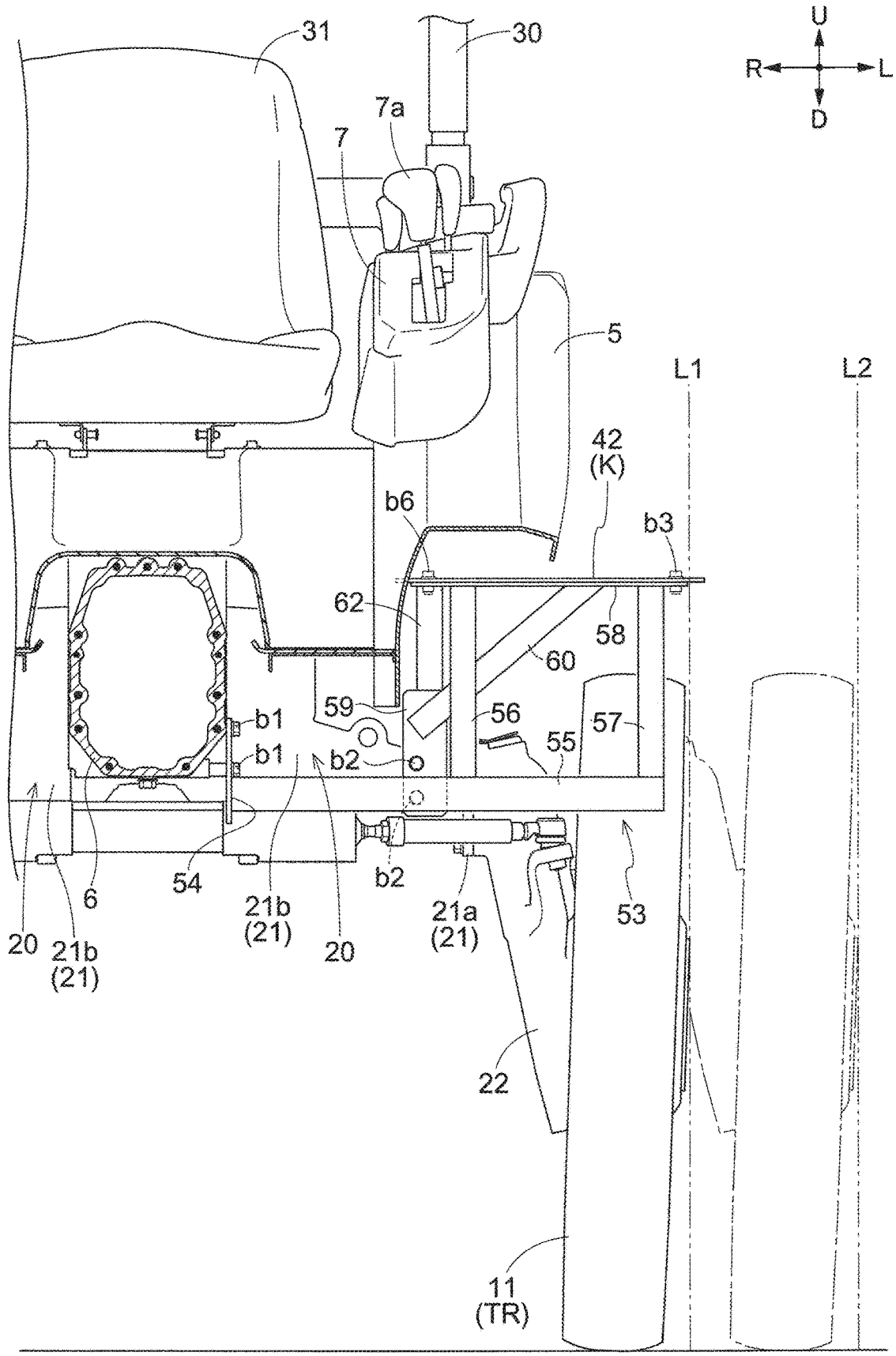
Figure 18:
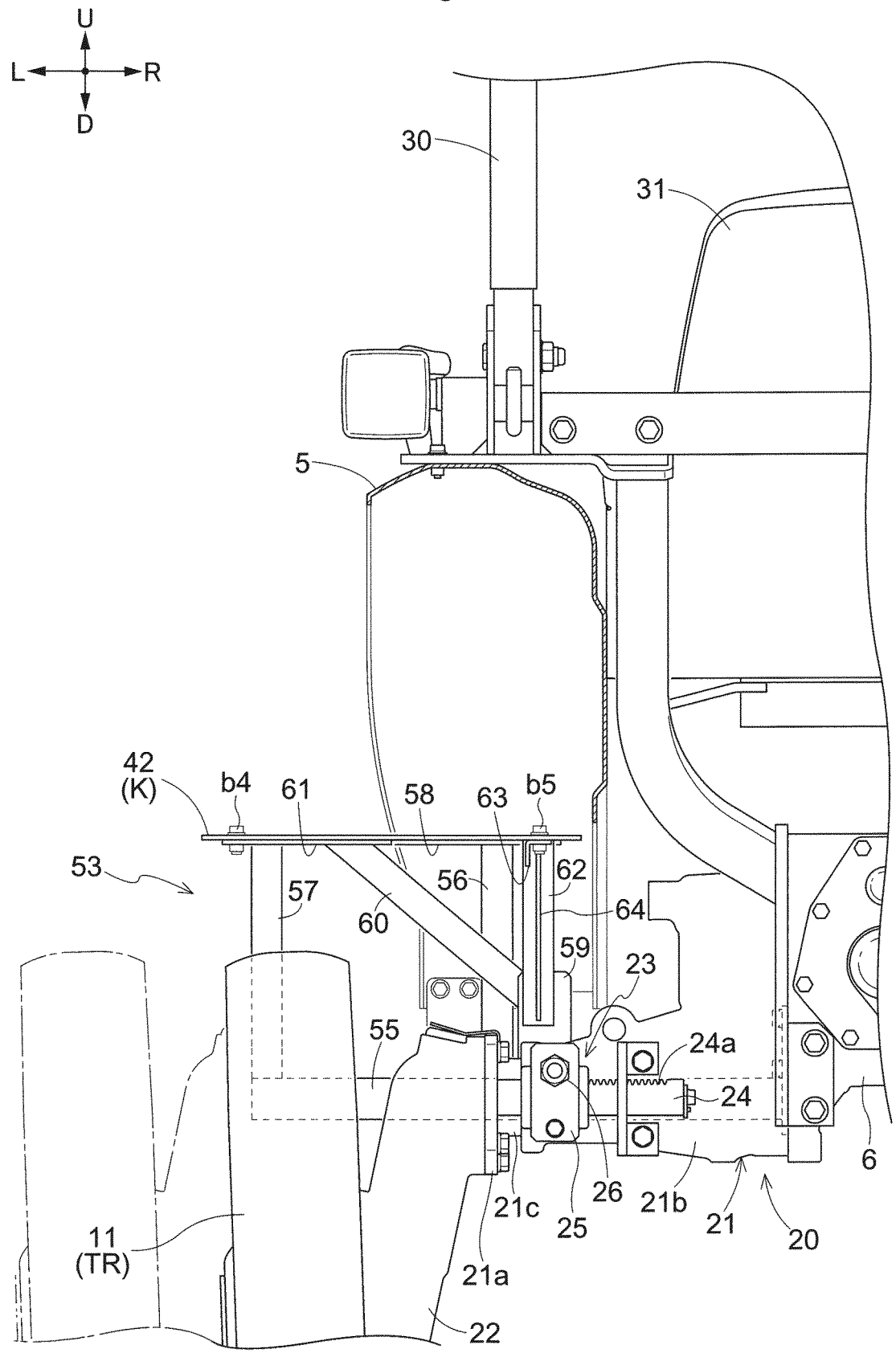
Figure 19:
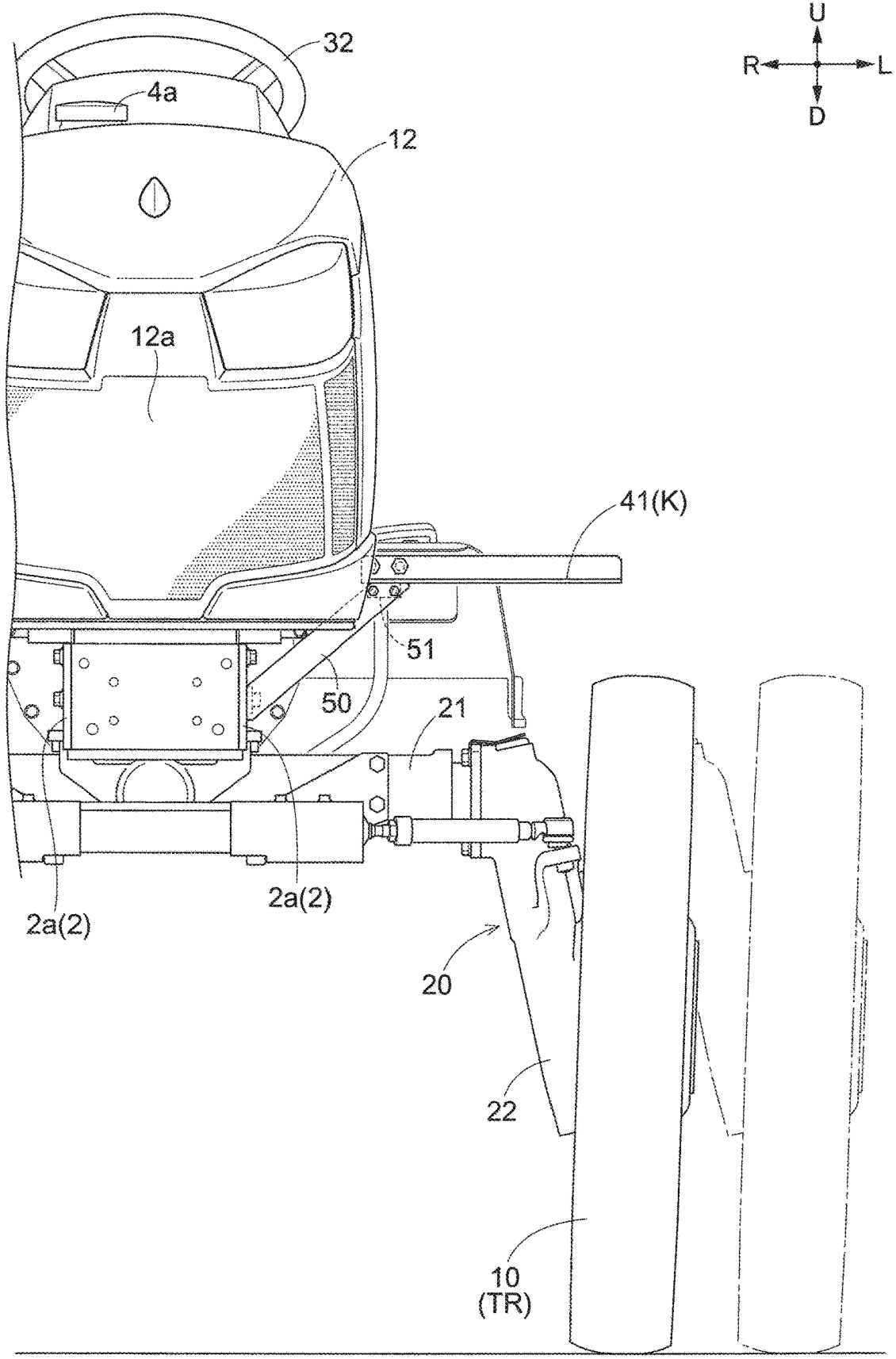
Figure 20:
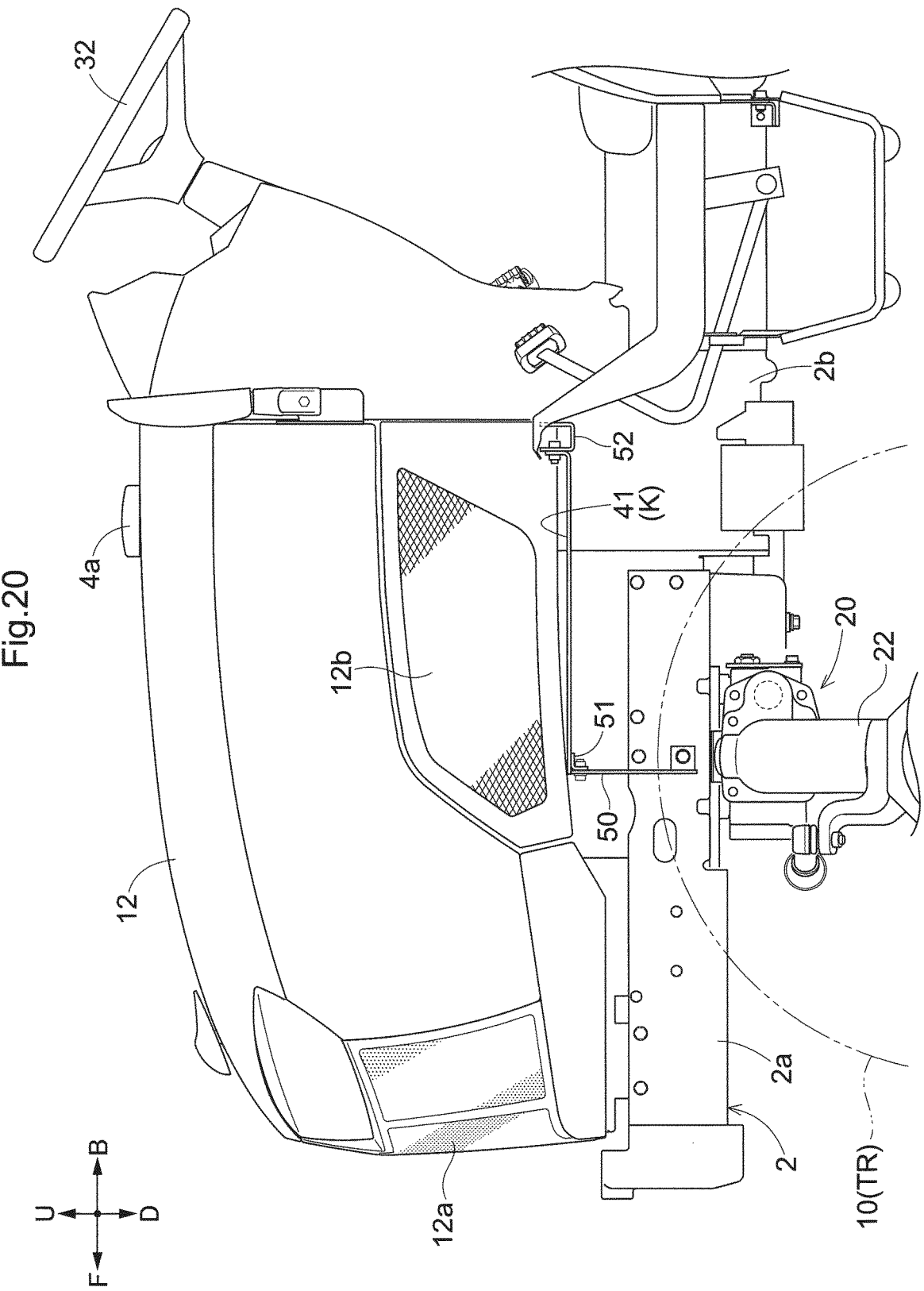
Figure 21:
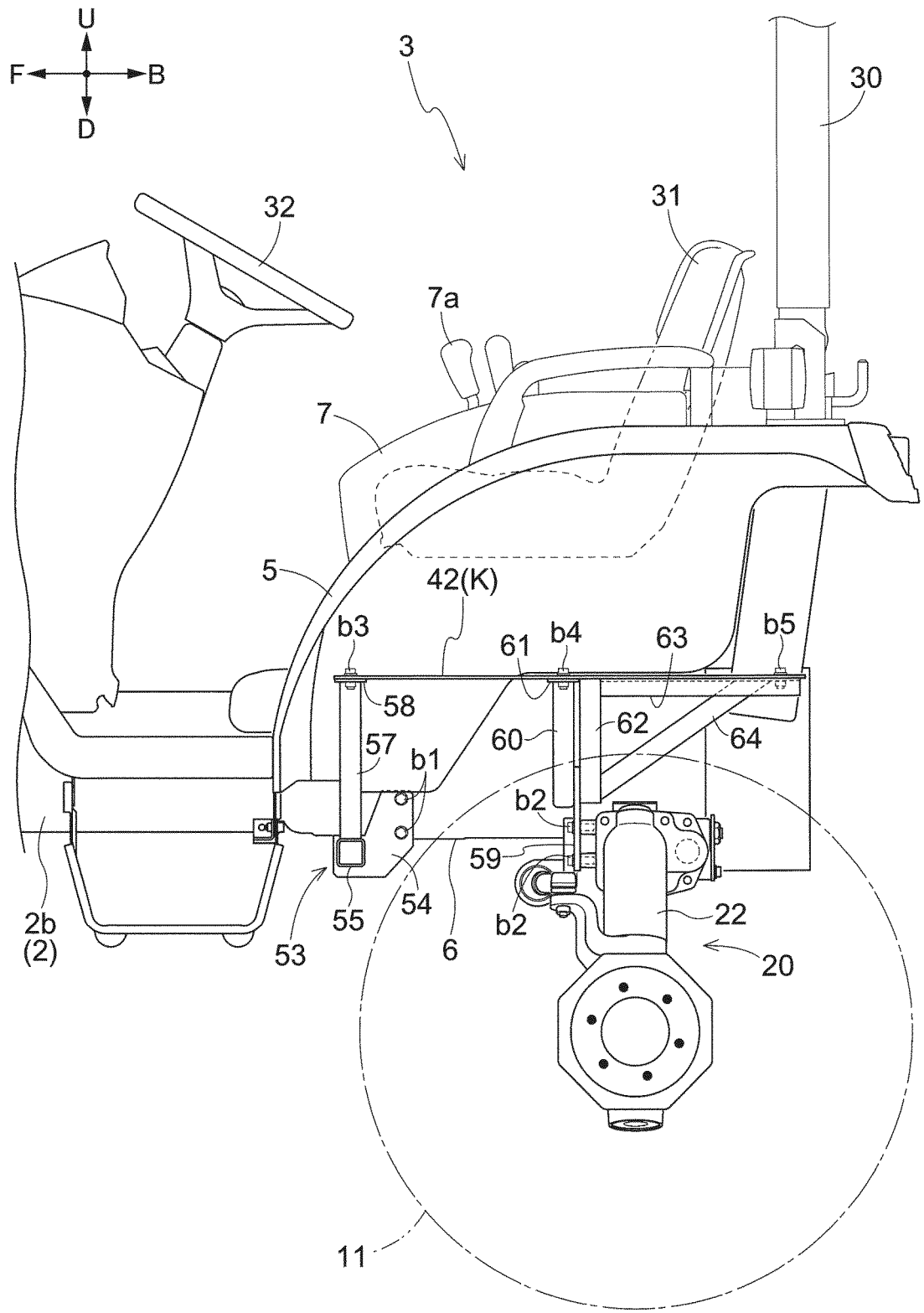

FIGS. 13 and 14 show the right duct support member 83. Hereinafter, the right duct support member 83 will be described. Note that the left and right duct support members 83 are formed laterally symmetrical to each other. For this reason, the following description also similarly applies to the left duct support member 83.

As shown in FIGS. 13 and 14, the right duct support member 83 has a base portion 84, a knob bolt 85, and an arm portion 86 corresponding to the "upper support"). The base portion 84 is a plate-shaped member in a horizontal orientation. The base portion 84 is attached to the lower surface of the duct receiving portion 37 from below. Also, the base portion 84 is supported by the duct receiving portion 37 in a state in which it can swing about the arm swing axis P2 extending along the body vertical direction.

As shown in FIG. 14, an elongated hole 37*a* is formed in the duct receiving portion 37. The elongated hole 37*a* is formed in a circular arc shape centered about the arm swing axis P2. The knob bolt 85 extends through the rear end portion of the base portion 84 in the vertical direction. Also, the knob bolt 85 is inserted into the elongated hole 37*a*. Note that the arm swing shaft core P2 passes through the front end portion of the base portion 84.

As shown in FIGS. 13 and 14, the arm portion 86 is an elongated member extending downward from the base portion 84. The upper end portion of the arm portion 86 is welded and fixed to the base portion 84. Also, the arm portion 86 has a holding portion 86*a*. The holding portion 86*a* is located at the lower end portion of the arm portion 86.

The holding portion 86*a* has a circular arc shape that extends along the outer shape in the peripheral direction of the rear lowering portion 81*d*. The holding portion 86*a* holds the leading end portion of the rear lowering portion 81*d*. With this configuration, the arm portion 86 supports the duct 81 in the driver section 3.

When the knob bolt 85 is tightened, the knob bolt 85 is fixed to the duct receiving portion 37. As a result, the swing position of the arm portion 86 is fixed.

When the knob bolt 85 is loosened, the knob bolt 85 can move along the elongated hole 37*a* with the knob bolt 85 inserted in the elongated hole 37*a*. For this reason, when the knob bolt 85 is loosened, the base portion 84, the knob bolt 85, and the arm portion 86 can swing in one piece about the arm swing axis P2.

That is, when the knob bolt 85 is loosened, the swing position of the arm portion 86 can be changed.

Note that the present invention is not limited to this. The shape of the arm portion 86 may be changeable. For example, the arm portion 86 may be expandable and contractible in the longitudinal direction. In this case, the shape of the arm portion 86 changes due to the expansion and contraction of the arm portion 86.

As described above, the tractor 1 is provided with an arm portion 86 that supports the duct 81 to the driver section 3 and can change at least one of its position and its shape. Also, according to the configuration described above, the arm portion 86 is supported by the roof frame 33.

As shown in FIG. 12, in the present preferred embodiment, the swing position of the arm portion 86 can be changed between a first swing position Q1 and a second swing position Q2.

The first swing position Q1 is the swing position of the arm portion 86 in a state where the arm portion 86 is displaced the most rearward. The second swing position Q2 is the swing position of the arm portion 86 when the arm portion 86 is displaced the most forward.

When the arm portion 86 is located at the second swing position Q2, the arm portion 86 is in a state of extending along the front-rear direction on the side above the head of the driver seated in the driver seat 31.

That is, the arm portion 86 can be changed to a state of extending along the front-rear direction on the side above the driver's head.

As shown in FIG. 12, when the arm portion 86 swings about the arm swing axis P2, the rear lowering portion 81*d* also swings about the arm swing axis P2 together with the arm portion 86. As a result, the position and orientation of the outlet 81*a* will change. That is, the position and orientation of the air outlet 81*a* change depending on the change in the swing position of the arm portion 86.

For example, if the right arm portion 86 swings from the first swing position Q1 to the second swing position Q2, the position of the outlet 81*a* corresponding to the right arm portion 86 moves to the front right. Also, the orientation of the outlet 81*a* changes from a right rear orientation to a left rear orientation.

Note that the present invention is not limited to this. It is also possible for only one of the position and the orientation of the outlet 81*a* to change due to the change in the swing position of the arm portion 86.

That is, the tractor 1 is configured such that at least one of the position and the orientation of the outlet 81*a* changes according to the change of the arm portion 86.

As shown in FIGS. 1 and 3, the tractor 1 includes two drain pipes 90. Note that the present invention is not limited to this, and the number of drain pipes 90 provided may be one or three or more.

Hereinafter, the configuration of the drain pipe 90 will be described.

As shown in FIGS. 3 and 4, the drain pipes 90 are connected to the lower portion of the air conditioner unit 75. The drain pipes 90 discharge waste water generated due to the heat exchange in the heat exchange portion 76.

That is, the tractor 1 includes the drain pipes 90 connected to the air conditioner unit 75.

Here, as described above, the air conditioner unit 75 is supported by the rear deck 42. Also, the rear deck 42 does not follow the movement of the travel apparatus TR when the tread of the left and right travel apparatuses TR is changed. That is, the rear deck 42 is provided on the side of the body frame 2 with respect to the tread changing apparatus 23.

That is, the air conditioner unit 75 is supported by the rear deck 42 provided on the side of the body frame 2 with respect to the tread changing apparatus 23. Also, a rear deck 42 that does not follow the movement of the travel apparatus TR when the tread is changed is provided above the travel apparatus TR.

Also, the vertical case portion 22 follows the movement of the travel apparatus TR when the tread of the left and right travel apparatuses TR is changed. That is, the vertical case portion 22 is provided on the side of the travel apparatus TR with respect to the tread changing apparatus 23.

As shown in FIGS. 3 and 7, each drain pipe 90 hangs downward from the lower portion of the air conditioner unit 75 through a hole (not shown) provided in the rear deck 42. As a result, each drain pipe 90 hangs downward from the hole provided in the deck 42.

Each drain pipe 90 has a drain port 91, an intermediate portion 92, and a drain port-side portion 93. The drain port 91 is located at the lower end portion of the drain pipe 90. The waste water that has passed through the drain pipe 90 is discharged from the drain port 91.

The drain port-side portion 93 is located at the lower portion of the drain pipe 90. The drain port 91 is provided at the lower end portion of the drain port-side portion 93. The intermediate portion 92 is located above (upstream of) the drain port-side portion 93. Also, the drain port-side portion 93 is extended vertically along the vertical case portion 22 corresponding to the rear wheel 11 on the body left side.

That is, the drain port-side portion 93 is extended vertically along the vertical case portion 22.

As shown in FIGS. 3 and 7, the tractor 1 includes a first holding member 94, a second holding member 95, and a third holding member 96. The first holding member 94, the second holding member 95, and the third holding member 96 all have a U-shape.

The first holding member 94 is welded and fixed to the first diagonal frame 60. The intermediate portion 92 is supported by the first holding member 94. As a result, the intermediate portion 92 is supported by the rear deck 42 via the first holding member 94 and the first diagonal frame 60.

That is, the intermediate portion 92 of the drain pipe 90 is supported by the rear deck 42.

The second holding member 95 is welded and fixed to the upper end portion of the vertical case portion 22 corresponding to the rear wheel 11 on the body left side. Also, the third holding member 96 is welded and fixed to the lower portion of the vertical case portion 22 corresponding to the rear wheel 11 on the body left side. The drain port-side portion 93 is supported by the second holding member 95 and the third holding member 96.

As a result, the drain port-side portion 93 is supported by the vertical case portion 22 via the second holding member 95 and the third holding member 96. For this reason, the drain port-side portion 93 moves following the movement of the travel apparatus TR when the tread of the left and right travel apparatuses TR is changed.

That is, the drain port-side portion 93 of the drain pipe 90, which is provided with the drain port 91, is supported by the vertical case portion 22 provided on the side of the travel apparatus TR with respect to the tread changing apparatus 23, and moves following the movement of the travel apparatus TR when the tread is changed. Also, the drain pipe 90 hangs downward from the rear deck 42, and the drain port-side portion 93 is supported by the vertical case portion 22.

As shown in FIG. 3, the drain port-side portion 93 is arranged in a state in which the drain port 91 is located on the right side relative to the rear wheel 11 on the body left side. As a result, the drain port 91 is located within the width of the tread. With this configuration, the wastewater from the drain port 91 is drained within the width of the tread.

In this manner, the drain port-side portion 93 is supported by the vertical case portion 22 such that the wastewater from the drain port 91 is drained within the width of the tread.

Also, FIGS. 3 and 7 show a rotational axis P3 of the rear wheel 11. The lower end of the drain port-side portion 93 is located below the rotational axis P3 of the rear wheel 11.

That is, the drain port-side portion 93 is extended in the vertical direction at least to a height corresponding to the rotational axis P3 of the rear wheel 11.

According to the configuration described above, the air conditioner unit 75 is located on the side of the body. For this reason, the arrangement position of the air conditioner unit 75 is low compared to the case where the air conditioner unit 75 is arranged on the ceiling of the driver section 3. As a result, the position of the center of gravity of the tractor 1 is relatively low. As a result, the orientation of the tractor 1 is stable.

That is, with the configuration described above, the stability of the orientation of the tractor 1 can be improved.

Also, according to the configuration described above, the drain port-side portion 93 of the drain pipe 90 moves following the movement of the travel apparatus TR when the tread is changed. This makes it easy to control the position of the drain port 91 in the body left-right direction by changing the tread.

That is, if the tread is changed appropriately, it is possible to avoid a situation in which the waste water discharged from the air conditioner unit 75 undesirably falls on an object. For example, when the tractor 1 travels along the longitudinal direction of the ridges in the ridge field, if the tread is changed appropriately, it is possible to avoid a situation in which the waste water discharged from the air conditioner unit 75 is applied to the ridges and the crops planted in the ridges.

Accordingly, with the configuration described above, it is possible to realize the tractor 1 in which it is easy to avoid a situation where the waste water discharged from the air conditioner unit 75 undesirably falls on an object.

Also, according to the configuration described above, the converter 71 is located on the side of the body. For this reason, the arrangement position of the converter 71 is low compared to that in the case where the converter 71 is placed above the body. As a result, the position of the center of gravity of the tractor 1 is relatively low. As a result, the orientation of the tractor 1 is stable.

That is, with the configuration described above, the stability of the orientation of the tractor 1 can be improved.

Modifications of the First Preferred Embodiment

The arrangement of some or all of the elements or members may be reversed in the left-right direction.

The front portion of the duct 81 may be retractable to a position rearward of the front end portion of the driver seat 31 by changing the swing position of the arm portion 86. For example, the first swing position Q1 may be the same as that of the above-described preferred embodiment, and the arm portion 86 may be swingable 180 degrees from the first swing position Q1 to the body outer side. In this case, when the arm portion 86 is swung 180 degrees from the first swing position Q1 to the body outer side, the front portion of the duct 81 is retracted to a position rearward of the front end portion of the driver seat 31.

That is, the tractor 1 may be configured such that the front portion of the duct 81 can be retracted to a position rearward of the front end portion of the driver seat 31 by changing the arm portion 86.

The air conditioner unit 75 may be provided on the front side or the rear side of the body.

The air conditioner unit 75 may protrude to the body outer side in the body left-right direction relative to the lateral outer end portion of the travel apparatus TR on one side in the body left-right direction. For example, the outer end position on the body left side of the air conditioner unit 75 may be located on the body left side relative to the second left end position L2. That is, the lateral outer end of the air conditioner unit 75 may be located on the body outer side in the body left-right direction with respect to the lateral outer end of the travel apparatus TR on the body left side when the tread is widest.

The tread changing apparatus 23 need not be provided. That is, a configuration is also possible in which the tread of the left and right travel apparatuses TR cannot be changed. Furthermore, in a configuration in which the tread of the left and right travel apparatuses TR cannot be changed, the lateral outer end of the air conditioner unit 75 may be located on the body outer side in the body left-right direction relative to the lateral outer end portion of the travel apparatus TR on the body left side, or may be located toward the body center in the body left-right direction relative to the lateral outer end portion of the travel apparatus TR on the body left side.

The air conditioner unit 75 may be provided at a position lower than the upper end position of the travel apparatus TR.

The air conditioner unit 75 may be provided at a position higher than that of the fender 5.

In the above preferred embodiment, the body left side corresponds to "one side in the body left-right direction". However, the present invention is not limited to this. The "one side in the body left-right direction" may be the body right side.

The portion fixed by welding in the above-described preferred embodiment may be fixed using any fixing method other than welding.

The drain pipe 90 may extend in the body left-right direction.

The drain port-side portion 93 may be provided in a state in which the waste water from the drain port 91 is drained outside the width of the tread.

The drain port-side portion 93 need not be extended at least to a height corresponding to the rotation axis P3 of the rear wheel 11 in the vertical direction. That is, the height position of the drain port 91 may be higher than the rotating axis P3 of the rear wheel 11.

The converter 71 may be provided on the front side or the rear side of the body.

The converter 71 may protrude to the body outer side in the body left-right direction relative to the lateral outer end portion of the travel apparatus TR on one side in the body left-right direction. For example, the outer end position on the body left side of the converter 71 may be located on the body left side relative to the first left end position L1. That is, the lateral outer end of the converter 71 may be located on the body outer side in the body left-right direction relative to the lateral outer end portion of the travel apparatus TR on the body left side in the state where the tread is narrowest. Also, the outer end position on the body left side of the converter 71 may be located on the body left side relative to the second left end position L2. That is, the lateral outer end of the converter 71 may be located on the body outer side in the body left-right direction relative to the lateral outer end portion of the travel apparatus TR on the body left side in the state where the tread is widest.

The tread changing apparatus 23 need not be provided. That is, a configuration is also possible in which the tread of the left and right travel apparatuses TR cannot be changed. Furthermore, in the configuration in which the tread of the left and right travel apparatuses TR cannot be changed, the lateral outer end of the converter 71 may be located on the body outer side in the body left-right direction relative to the lateral outer end portion of the travel apparatus TR on the body left side, or may be located toward the body center in the body left-right direction relative to the lateral outer end portion of the travel apparatus TR on the body left side.

The converter 71 may be provided at a position lower than the upper end position of the travel apparatus TR.

The battery 18 may be arranged at the position of the converter 71 in the above-described preferred embodiment. In this case, the battery 18 corresponds to the "power supply apparatus".

Second Preferred Embodiment

As described above, in the first preferred embodiment, the converter 71, the air conditioner unit 75, and the duct 81 are provided in the tractor 1. However, the present invention is not limited to this.

Hereinafter, the tractor 1 according to FIGS. 15 to 21, which is the second preferred embodiment of the present invention, will be described with reference to the drawings. Note that configurations other than the portions described below are the same as those of the first preferred embodiment described above. Also, configurations that are the same as those in the first preferred embodiment are denoted by the same reference numerals. In other words, among the elements and members of the second preferred embodiment, elements and members denoted by the same reference numerals as those of the first preferred embodiment have the same configuration as the elements and members of the first preferred embodiment. For example, the body frame 2 of the second preferred embodiment has the same configuration as the body frame 2 of the first preferred embodiment.

In the following description, the direction of arrow F and the direction of arrow B shown in FIGS. 15, 16, 20, and 21 respectively are "front" and "rear", and the direction of arrow L and the direction of arrow R shown in FIGS. 16 to 19 respectively are "left" and "right". Also, the direction of arrow U and the direction of arrow D shown in FIGS. 15 and 17 to 21 respectively are "up" and "down".

As described in FIGS. 15 to 21, the tractor 1 of the second preferred embodiment does not include the converter 71, the air conditioner unit 75, and the duct 81.

For example, an air conditioner unit (not shown) for the driver section 3, a converter for the air conditioner unit (not shown), and the like may be mounted on the respective decks K.

According to the configuration described above, the decks K protrude to the body outer side, and therefore it is possible to easily place an electrically-powered apparatus, a work tool, and the like to be additionally placed on the deck K. Moreover, since the decks K are supported by the body frame 2, the apparatuses, tools, and the like mounted on the decks K are likely to be stably supported by the decks K.

As a result, it is possible to ensure space on the decks K in which electrically-powered apparatuses, work tools, and the like to be additionally mounted can be placed.

That is, with the configuration described above, the expandability of functions and convenience of the tractor 1 can be improved.

Modifications of the Second Preferred Embodiment

The arrangement of some or all of the elements and members may be reversed in the left-right direction.

The deck K may be provided on the front side or the rear side of the body.

The deck K may protrude to the body outer side in the body left-right direction relative to the lateral outer end portion of the travel apparatus TR on one side in the body left-right direction. For example, the fourth left end position L4 shown in FIG. 16 may be located on the body left side relative to the second left end position L2. That is, the lateral outer end of the rear deck 42 may be located on the body outer side in the body left-right direction relative to the lateral outer end portion of the travel apparatus TR on the body left side in the state where the tread is widest.

The tread changing apparatus 23 need not be provided. That is, a configuration is also possible in which the tread of the left and right travel apparatuses TR cannot be changed. Furthermore, in a configuration in which the tread of the left and right travel apparatuses TR cannot be changed, the lateral outer end of each deck K may be located on the body outer side in the body left-right direction relative to the lateral outer end portion of the travel apparatus TR on the body left side, or may be located closer to the body center in the body left-right direction relative to the lateral outer end of the travel apparatus TR on the body left side.

The deck K may be provided at a position lower than the upper end position of the travel apparatus TR.

The deck K may be provided at a position higher than the fender 5.

In the above-described preferred embodiment, the body left side corresponds to "one side in the body left-right direction". However, the present invention is not limited to this. The "one side in the body left-right direction" may be the body right side.

The portion fixed by welding in the above preferred embodiment may be fixed by any fixing method other than welding.

It should be noted that the configuration disclosed in each of the above-described preferred embodiments including modifications thereof can be applied in combination with the configuration disclosed in other preferred embodiments and modifications thereof as long as there is no contradiction. Moreover, the preferred embodiments and modifications thereof disclosed in this specification are exemplary, and the preferred embodiments and modifications thereof of the present invention are not limited thereto, and can be appropriately modified without departing from the spirit of the present invention.

Preferred embodiments of the present invention and modifications thereof can be used not only in tractors but also in various work vehicles such as combines, rice transplanters, and construction work machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a body;
a driver section;
left and right fenders; and
an air conditioner; wherein
the air conditioner is supported on the body and located on a side of the body;
the air conditioner is provided on one side of the body; and
the air conditioner is provided below and overlapping one of the left and right fenders in a plan view.

2. The work vehicle according to claim 1, further comprising:
left and right travel apparatuses; wherein
the air conditioner is provided toward a body center in a body left-right direction relative to a lateral outer end portion of one of the left and right travel apparatuses on the one side in the body left-right direction.

3. The work vehicle according to claim 1, further comprising:
left and right travel apparatuses; wherein
the air conditioner is provided above and overlapping one of the left and right travel apparatuses on the one side in a body left-right direction in the plan view.

4. The work vehicle according to claim 3, further comprising:
front travel apparatuses and rear travel apparatuses; wherein
the air conditioner is provided above and overlapping one of the rear travel apparatuses on the one side in the body left-right direction in the plan view.

5. The work vehicle according to claim 1, wherein
left and right travel apparatuses protrude outward in a body left-right direction relative to the left and right fenders; and
the air conditioner extends between a location above the one of the left and right travel apparatuses on the one side in the body left-right direction and a location below the one of the left and right fenders on the one side in the body left-right direction.

6. The work vehicle according to claim 1, further comprising:
a duct to guide air from the air conditioner to the driver section; and
a connection portion connecting the duct and the air conditioner; wherein
the air conditioner protrudes outward in a body left-right direction relative to one of the left and right fenders on the one side in the body left-right direction; and
the connection portion is provided at an upper surface of a portion of the air conditioner that protrudes from the one of the left and right fenders on the one side in the body left-right direction.

7. The work vehicle according to claim 1, further comprising:
a power source; and
a converter to convert a voltage of electricity to be supplied from the power source into a needed voltage of the air conditioner; wherein
the converter is provided on one side in a body left-right direction relative to a central position of the body in the body left-right direction.

8. The work vehicle according to claim 1, wherein
the driver section includes a driver seat; and
the air conditioner is provided at a position lower than an upper end portion of the driver seat.

9. A work vehicle comprising:
a body;
a driver section; and
an air conditioner; wherein
the air conditioner is supported on the body and located on a side of the body;
the air conditioner includes a heat exchanger and a case to accommodate the heat exchanger; and
the case includes an intake port provided for the heat exchanger and located at a position of the case facing toward a center of the body in a plan view.

10. The work vehicle according to claim 9, further comprising a wall that extends over a vertical width of the intake port and extends over a lateral width of the intake port, at a position opposing the intake port and spaced apart from the intake port.

11. A work vehicle comprising:
a main body supported by a body frame;
left and right travel apparatuses to support the main body;
at least one deck that protrudes to a body outer side relative to the main body; and
left and right fenders that are each located above a respective one of the left and right travel apparatuses in a side view; wherein
the deck is supported by the body frame;
the deck is provided on one side of the body; and
the deck is provided below and overlapping one of the left and right fenders on the one side in a plan view.

12. The work vehicle according to claim 11, wherein the deck is provided toward a body center in a body left-right direction relative to a lateral outer end portion of one of the left and right travel apparatuses on the one side in the body left-right direction.

13. The work vehicle according to claim 11, wherein the deck is provided at a position higher than the left and right travel apparatuses.

14. The work vehicle according to claim 11, wherein
the left and right travel apparatuses include front travel apparatuses and rear travel apparatuses; and
the at least one deck includes a plurality of decks; and
the plurality of decks include a front deck above and overlapping one of the front travel apparatuses on one side in a body left-right direction in the plan view, and a rear deck above and overlapping one of the rear travel apparatuses on the one side in the body left-right direction in the plan view.

15. The work vehicle according to claim 11, further comprising:
a support frame to support the deck; wherein
the deck is provided at a position between one of the left and right travel apparatuses on the one side in a body left-right direction and the one of the left and right fenders on the one side in the body left-right direction in a body vertical direction;
the support frame is on an inner side in the body left-right direction of the one of the left and right travel apparatuses on the one side in the body left-right direction, and below the one of the left and right fenders on the one side in the body left-right direction;
the support frame is supported by the body frame; and
the deck is detachable outward in the body left-right direction by decoupling the deck and the support frame from each other.

16. The work vehicle according to claim 15, wherein the support frame is fastened and fixed to the body frame and is attachable to and detachable from the body frame.

17. A work vehicle comprising:
a driver section;
a body frame to support the driver section;
left and right travel apparatuses to support the body frame;
a tread changing apparatus to change a tread between the left and right travel apparatuses by moving the travel apparatuses in a body left-right direction with respect to the body frame;
an air conditioner;
a drain pipe connected to the air conditioner and including a drain port and a drain port-side portion at which a drain portion is provided;
a first support provided on a body frame-side with respect to the tread changing apparatus; and
a second support provided toward the left and right travel apparatuses with respect to the tread changing apparatus; wherein
the air conditioner is supported by the first support; and
the drain port-side portion is supported by the second support and is movable following movement of the left and right travel apparatuses when the tread is changed.

18. The work vehicle according to claim 17, wherein the drain port-side portion is supported by the second support such that waste water from the drain port is drained within a width of the tread.

19. The work vehicle according to claim 17, wherein the left and right travel apparatuses include left and right wheels; and
the drain port-side portion extends at least to a height corresponding to a rotation axis of one of the left and right wheels in a vertical direction.

20. The work vehicle according to claim 17, wherein
the left and right travel apparatuses include left and right wheels;
the work vehicle includes a transmission supported by the body frame; and
left and right axle cases connecting the transmission and the left and right wheels; wherein
each of the left and right axle cases includes a horizontal case portion extended outward in a body left-right direction from the transmission and a vertical case portion that is extended downward from a free end of the horizontal case portion and has a lower end portion on which one of the left and right wheels is supported;
the tread changing apparatus is provided in the horizontal case portion to change an extension length of the horizontal case; and
the drain port-side portion is supported by the vertical case portion.

21. The work vehicle according to claim 20, wherein the drain port-side portion is extended vertically along the vertical case portion.

22. The work vehicle according to claim 17, wherein
the left and right travel apparatuses include an upper support thereabove that does not follow movement of the left and right travel apparatuses when the tread is changed and supports an intermediate portion of the drain pipe; and
the drain pipe hangs downward from the upper support and the drain port-side portion is supported by the second support.

23. The work vehicle according to claim 22, wherein the air conditioner is mounted on and supported by the upper support.

24. A work vehicle comprising:
a body;
a power supply apparatus;
an electrically-powered apparatus operable as a result of being supplied with electricity from the power supply apparatus;
an engine hood at a front portion of the body to accommodate an engine; and
an exhaust grille at a lateral side portion of the engine hood to discharge cooling air after cooling the engine; wherein
the power supply apparatus is supported on the body and located on a side of the body;
the power supply apparatus is provided on one lateral side of the body; and
the power supply apparatus is provided on a lateral side of the exhaust grille.

25. The work vehicle according to claim 24, further comprising:
left and right travel apparatuses; wherein
the power supply apparatus is provided above and overlapping one of the left and right travel apparatuses on one side in a body left-right direction in a plan view.

26. The work vehicle according to claim 25, wherein
the left and right travel apparatuses include front travel apparatuses and rear travel apparatuses; and
the power supply apparatus is provided above and overlapping one of the front travel apparatuses on one side in the body left-right direction in the plan view.

27. The work vehicle according to claim 25, wherein the power supply apparatus is provided toward a body center relative to a lateral outer end portion of one of the left and right travel apparatuses in the body left-right direction.

28. The work vehicle according to claim 24, wherein the power supply apparatus includes an outer case including:
- a first opening at a portion of the outer case opposing the exhaust grille and capable of receiving the cooling air; and
- a second opening at a portion of the outer case located on a side opposite to the first opening in a direction of approaching and moving away from the body.

29. A work vehicle comprising:
a body;
a power supply apparatus;
an electrically-powered apparatus operable as a result of being supplied with electricity from the power supply apparatus;
a battery;
an engine; and
an engine hood at a front portion of the body to accommodate the engine and the battery; wherein
the power supply apparatus is supported on the body and located on a side of the body;
the power supply apparatus is provided on one lateral side of the body;
the power supply apparatus includes a converter to convert a voltage of electricity supplied from the battery into a needed voltage for the electrically-powered apparatus;
the power supply apparatus is provided on a lateral side of a portion of the engine hood that is rearward of a position at which the battery is provided in a body front-rear direction; and
the electrically-powered apparatus is provided rearward of the power supply apparatus in the body front-rear direction, and on one side in the body left-right direction relative to a central position of the body in the body left-right direction.

\* \* \* \* \*